(12) United States Patent
Borke et al.

(10) Patent No.: US 9,939,887 B2
(45) Date of Patent: Apr. 10, 2018

(54) AVATAR CONTROL SYSTEM

(71) Applicant: VENTANA 3D, LLC, Van Nuys, CA (US)

(72) Inventors: Michael James Borke, Los Angeles, CA (US); Ashley Crowder, Venice, CA (US); Benjamin Conway, Santa Monica, CA (US)

(73) Assignee: VENTANA 3D, LLC, Van Nuys, CA (US)

( * ) Notice: Subject to any disclaimer, the term of this patent is extended or adjusted under 35 U.S.C. 154(b) by 0 days.

(21) Appl. No.: 15/065,815

(22) Filed: Mar. 9, 2016

(65) Prior Publication Data

US 2016/0267699 A1   Sep. 15, 2016

Related U.S. Application Data

(60) Provisional application No. 62/129,992, filed on Mar. 9, 2015, provisional application No. 62/129,994, filed on Mar. 9, 2015, provisional application No. 62/129,995, filed on Mar. 9, 2015, provisional application No. 62/129,998, filed on Mar. 9, 2015, provisional application No. 62/130,001, filed on Mar. 9, 2015, provisional application No. 62/130,003, filed on Mar. 9, 2015.

(51) Int. Cl.
| | |
|---|---|
| *G06T 13/00* | (2011.01) |
| *G06F 3/00* | (2006.01) |
| *G06F 3/01* | (2006.01) |
| *G02B 27/22* | (2018.01) |

(52) U.S. Cl.
CPC ......... *G06F 3/005* (2013.01); *G02B 27/2292* (2013.01); *G06F 3/011* (2013.01)

(58) Field of Classification Search
None
See application file for complete search history.

(56) References Cited

U.S. PATENT DOCUMENTS

| 8,523,673 B1 | 9/2013 | Boyd et al. | |
|---|---|---|---|
| 2008/0082311 A1 | 4/2008 | Meijer et al. | |
| 2008/0084508 A1* | 4/2008 | Cole | H04N 9/75 348/744 |
| 2010/0134695 A1* | 6/2010 | O'Connell | A63J 5/021 348/722 |

(Continued)

FOREIGN PATENT DOCUMENTS

WO   WO-2012/166072 A1   12/2012

OTHER PUBLICATIONS

International Search Report dated Aug. 17, 2016 in connection with PCT/US2016/021634.

*Primary Examiner* — Peter Hoang
(74) *Attorney, Agent, or Firm* — Parker Ibrahim & Berg LLC; James M. Behmke; Stephen D. LeBarron

(57) ABSTRACT

Systems and methods herein are directed to avatar control systems. In one embodiment, interactive holographic avatar control is described. In another embodiment, remote kinetic avatar control is described. In still another embodiment, depth-based user tracking for avatar control is described. In still another embodiment, enhanced avatar kinetic movement interpolation is described. In still another embodiment, dynamic joint mapping for avatar control is described. In still another embodiment, dynamic animation population for avatar control is described.

18 Claims, 46 Drawing Sheets

(56) References Cited

U.S. PATENT DOCUMENTS

2010/0253700 A1* 10/2010 Bergeron ............... G03B 35/00
                                                        345/633
2011/0107216 A1   5/2011 Bi
2013/0201105 A1*  8/2013 Ptucha .................... G06F 3/017
                                                        345/158
2014/0340490 A1* 11/2014 Duffy ................. G02B 27/2221
                                                         348/51

* cited by examiner

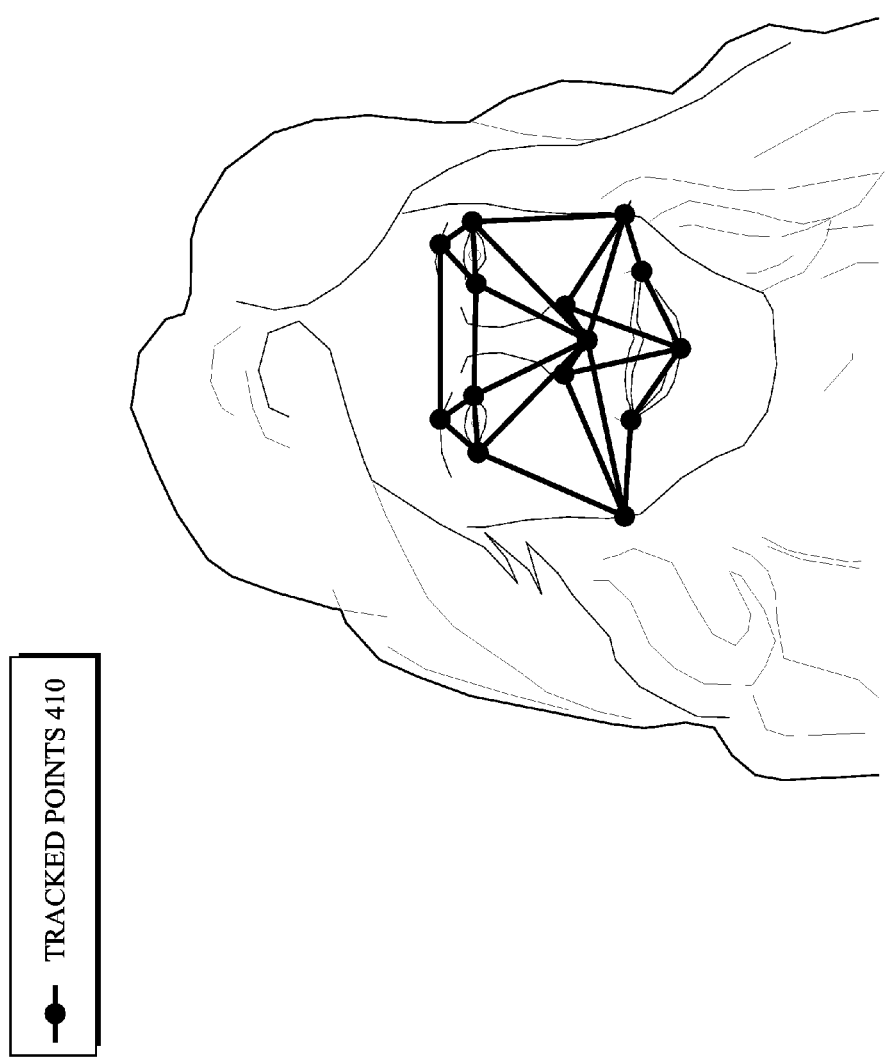

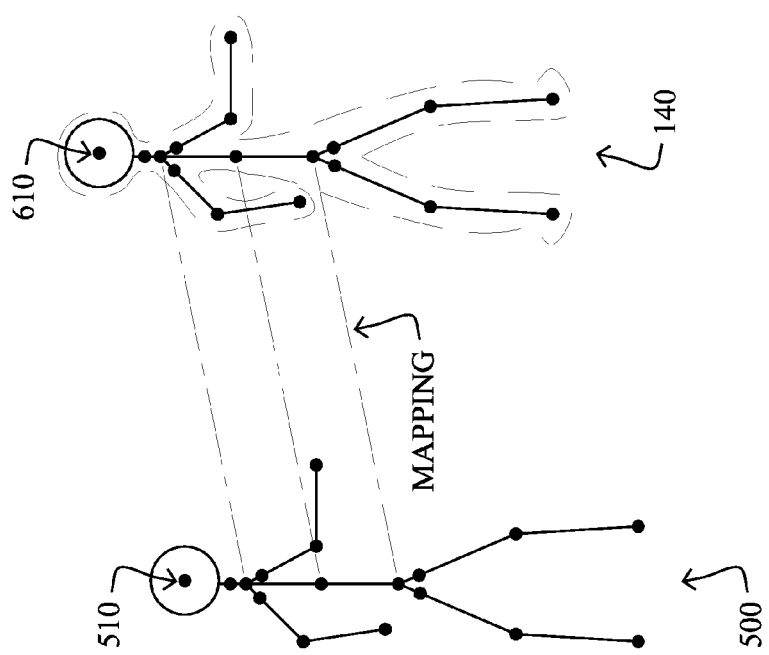

AVATAR CONTROL SYSTEM

RELATED APPLICATIONS

This application claims priority to the following U.S. Provisional applications, the contents of each of which are incorporated herein by reference:

U.S. Provisional Application No. 62/129,992 filed on Mar. 9, 2015 entitled INTERACTIVE HOLOGRAPHIC AVATAR CONTROL, by Borke, et al.;

U.S. Provisional Application No. 62/129,994 filed on Mar. 9, 2015, entitled REMOTE KINETIC AVATAR CONTROL, by Borke, et al.;

U.S. Provisional Application No. 62/129,995 filed on Mar. 9, 2015, entitled DEPTH-BASED USER TRACKING FOR AVATAR CONTROL, by Borke, et al.;

U.S. Provisional Application No. 62/129,998 filed on Mar. 9, 2015, entitled ENHANCED AVATAR KINETIC MOVEMENT INTERPOLATION, by Borke, et al.;

U.S. provisional Application No. 62/130,001 filed on Mar. 9, 2015, entitled DYNAMIC JOINT MAPPING FOR AVATAR CONTROL, by Borke, et al.; and U.S. provisional Application No. 62/130,003 filed on Mar. 9, 2015, entitled DYNAMIC ANIMATION POPULATION FOR AVATAR CONTROL, by Borke, et al.

TECHNICAL FIELD

The present disclosure relates generally to computer-generated graphics, and, more particularly, to computer-animated objects, such as for an avatar control system.

BACKGROUND

Computing applications such as computer games and multimedia applications have evolved from using controllers, remotes, keyboards, mice, or the like to allow users to manipulate game characters or other aspects of an application. In particular, computer games and multimedia applications have begun employing cameras and software gesture recognition engines to provide a natural user interface ("NUI"). With NUI, raw joint data and user gestures are detected, interpreted, and used to control characters or other aspects of an application. For example, in addition to cursor control and/or user-based selections, NUIs may also be configured to control the movement of digital avatars, which are a graphical representation of a user (or the user's alter ego or other character).

Notably, many advances have been developed in the realm of NUI systems, such as for detecting a person in the field of view of an image sensor, and correctly identifying the positions of his or her body parts within the field of view (e.g., using body tracking or skeletal tracking techniques). Still, NUI technology is an emerging field, particularly with regards to avatar control, and is currently limited in its applicability.

For instance, computer animation is typically a very time consuming activity requiring computer graphics (CG) expertise and use of specialist software tools and considerable computing power. First a model of an object will be generated in the form of a 3D mesh. A CG animator will then generate and embed a skeleton inside the 3D mesh of the object being animated and paint individual bone weights onto each vertex. At runtime, motion capture data or an inverse kinematics engine drives the bones of the character, which then transforms the mesh. Depending upon the level of experience of the user and the complexity of the object being animated, this process may take hours or days.

SUMMARY

According to one or more embodiments herein, interactive holographic avatar control is shown and described. In particular, various embodiments are described that allow for avatar control of holograms (holographic avatars), which allows a person to stand next to a holographic projection of a character (e.g., monster, celebrity, anthropomorphized object, etc.) and interact with it.

According to one or more additional embodiments herein, remote kinetic avatar control is shown and described. In particular, various embodiments are described that allow for streaming locally captured (e.g., live or pre-recorded) kinetic data of avatar control movement for remote control of that avatar (e.g., a two-dimensional or a three-dimensional displayed or holographic avatar). Doing so decreases the bandwidth required for streaming data to a remote location, e.g., for performing telepresence. As an example, a stage performer (e.g., musician, comedian, orator, etc.) may create an avatar model of himself or herself, where a live performance in one location (e.g., Los Angeles) could be used to control a holographic projection of the avatar model to likewise perform in a remote second location (e.g., New York) with the exact movements (e.g., in Los Angeles).

According to one or more additional embodiments herein, depth-based user tracking for avatar control is shown and described. In particular, various embodiments are described that allow for selecting a particular user from a given location that is located within a certain distance from a sensor/camera to control an avatar (e.g., a two-dimensional or a three-dimensional displayed or holographic avatar). For example, when many people are gathered around a sensor or simply walking by, it can be difficult to select one user to control the avatar, and further so to remain focused on that one user. Accordingly, various techniques are described (e.g., depth keying) to set an "active" depth space/range. In an additional embodiment, once a user is selected, that user remains as the selected user in control of the avatar, while other users may still be tracked in the background (e.g., within the active depth space) until the selected user is no longer tracked (e.g., steps out of view of the sensor). At this time, a subsequent user may be selected to control the avatar.

According to one or more additional embodiments herein, enhanced avatar kinetic movement interpolation is shown and described. In particular, various embodiments are described that allow for extrapolation of kinetic data in a manner that infers direction of a user's body parts to make an avatar move more accurately based on a user's physical movements. For instance, pre-programmed calculations (e.g., for any avatar model used) are defined for performing linear interpolating (lerping) and/or spherical lerping (slerping) in a manner that allows for smooth movement/animation of the joints, adding precision and realism to human-avatar mirroring.

According to one or more additional embodiments herein, dynamic joint mapping for avatar control is shown and described. In particular, various embodiments are described that allow for mapping any skinned digital avatar model (e.g., particularly a three-dimensional model) containing a joint hierarchy to an input control algorithm. For instance, the techniques herein first find a center/primary joint and moves out from there, that is, where the joint hierarchy defines each joint ("A") as a direct child of the closest connecting joint ("B") that can move said joint ("A") (e.g., ElbowJoint is a child of ShoulderJoint; ShoulderLeftJoint, ShoulderRightJoint, and NeckJoint are all direct children of SpineTopJoint, etc.). Notably, in one embodiment, if an avatar model is not provided, a default model may be used.

According to one or more additional embodiments herein, dynamic animation population for avatar control is shown and described. In particular, various embodiments are described that allow for animations to be provided for any imported avatar (e.g., two-dimensional or three-dimensional displayed or holographic avatars) that have no pre-configured animations, or else a limited set of pre-configured animations. For example, during a model mapping process of the avatar's creation, gesture-triggered and/or action-triggered animations may be automatically applied to the avatar model during its import. As such, performing any associated gesture or action trigger will control the imported avatar according to the supplied cross-model animations, assuming that relevant joints used in the cross-model animation are present and defined in the imported avatar model.

Other specific embodiments, extensions, or implementation details are also described below.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4B illustrate examples of tracked data points obtained from a video processing system in accordance with one or more embodiments herein;

FIGS. 27A-27C illustrate examples of dynamic joint mapping for avatar control in accordance with one or more embodiments herein;

DESCRIPTION OF EXAMPLE EMBODIMENTS

In computing, and as mentioned above, an avatar is the graphical representation of the user (or the user's alter ego or other character). Avatars may generally take either a two-dimensional (2D) form or three-dimensional (3D) form, and typically have been used as animated characters in computer games or other virtual worlds (e.g., in addition to merely static images representing a user in an Internet forum). To control an avatar or other computer-animated model (where, notably, the term "avatar" is used herein to represent humanoid and non-humanoid computer-animated objects that may be controlled by a user), a user input system converts user action into avatar movement.

Figure 1:
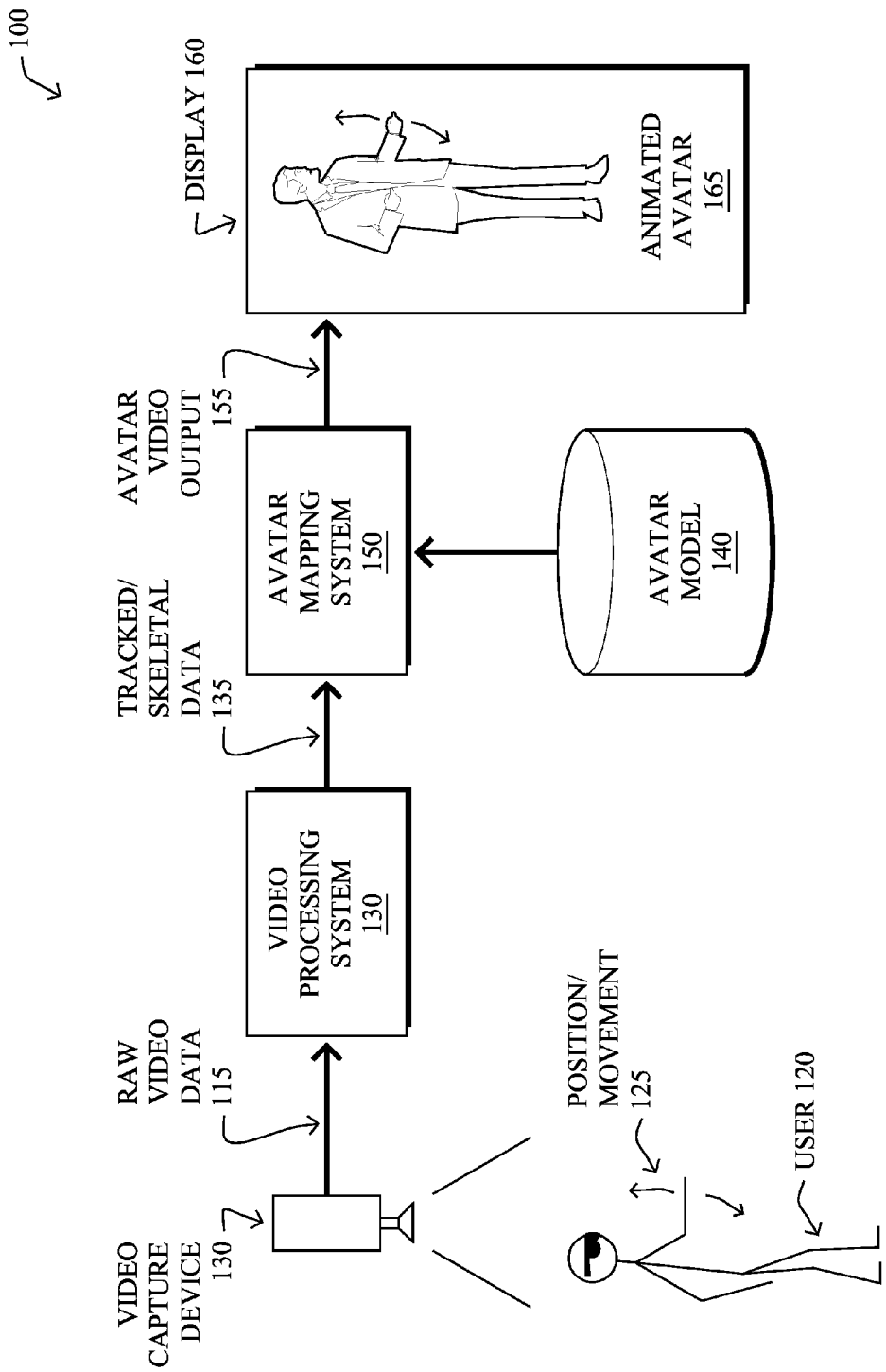
FIG. 1 illustrates an example avatar control system in accordance with one or more embodiments herein.

FIG. 1 illustrates a simplified example of an avatar control system in accordance with one or more embodiments of the present invention. In particular, as shown in the system 100, a video capture device 110 is configured to capture video images of one or more objects, particularly including one or more users 120 (e.g., a human or other moving objects, such as a robot, animal, etc.) that may have an associated position and/or movement 125. The video capture device 110 relays the captured video data 115, which may comprise color information, position/location information (e.g., depth information), etc., to a video processing system 130. At the video processing system 130, various body tracking and/or skeletal tracking algorithms can be used to detect the locations of various tracking points (e.g., bones, joints, etc.) of the user 120, which is then sent as tracked/skeletal data 135 to an avatar mapping system 150.

The avatar mapping system 150 may be populated with an avatar model 140, such that through various mapping algorithms (e.g., described below), the avatar mapping system is able to animate a given computer model 140 to establish an avatar video output 155 for output to a display 160. Accordingly, an animated avatar 165 may then be visually displayed by the display 160, while being controlled by the user 120.

The display 160 may comprise a television (TV), a monitor, a light-emitting diode (LED) wall, a projector, liquid crystal displays (LCDs), or any similar or otherwise suitable display. For instance, as described in greater detail below, display 160 may also comprise a holographic projection of the model animated avatar 165, such as displaying a character as part of a "Pepper's Ghost" illusion setup, e.g., allowing an individual to interactively control a holographic projection of a character.

Notably, the avatar mapping system 150 may provide its control functionality in real-time or as a recorded/post-production video feed, and may be co-located with the video processing system 130, remotely located from the video processing system, or as divided components allowing it to be both local to and remote from the video processing system, as described in greater detail below. Note further that while the avatar mapping system 150 and video processing system 130 are shown as separate components, they may, in certain embodiments, be embodied as a singular device, with merged capabilities. In particular, while the avatar mapping system is shown receiving the tracked/skeletal data 135 process by the video processing system 130, it may, in fact, be configured to receive raw frame data 115 from the video capture device 110, and may process the tracked/skeletal data 135 itself.

Figure 2:
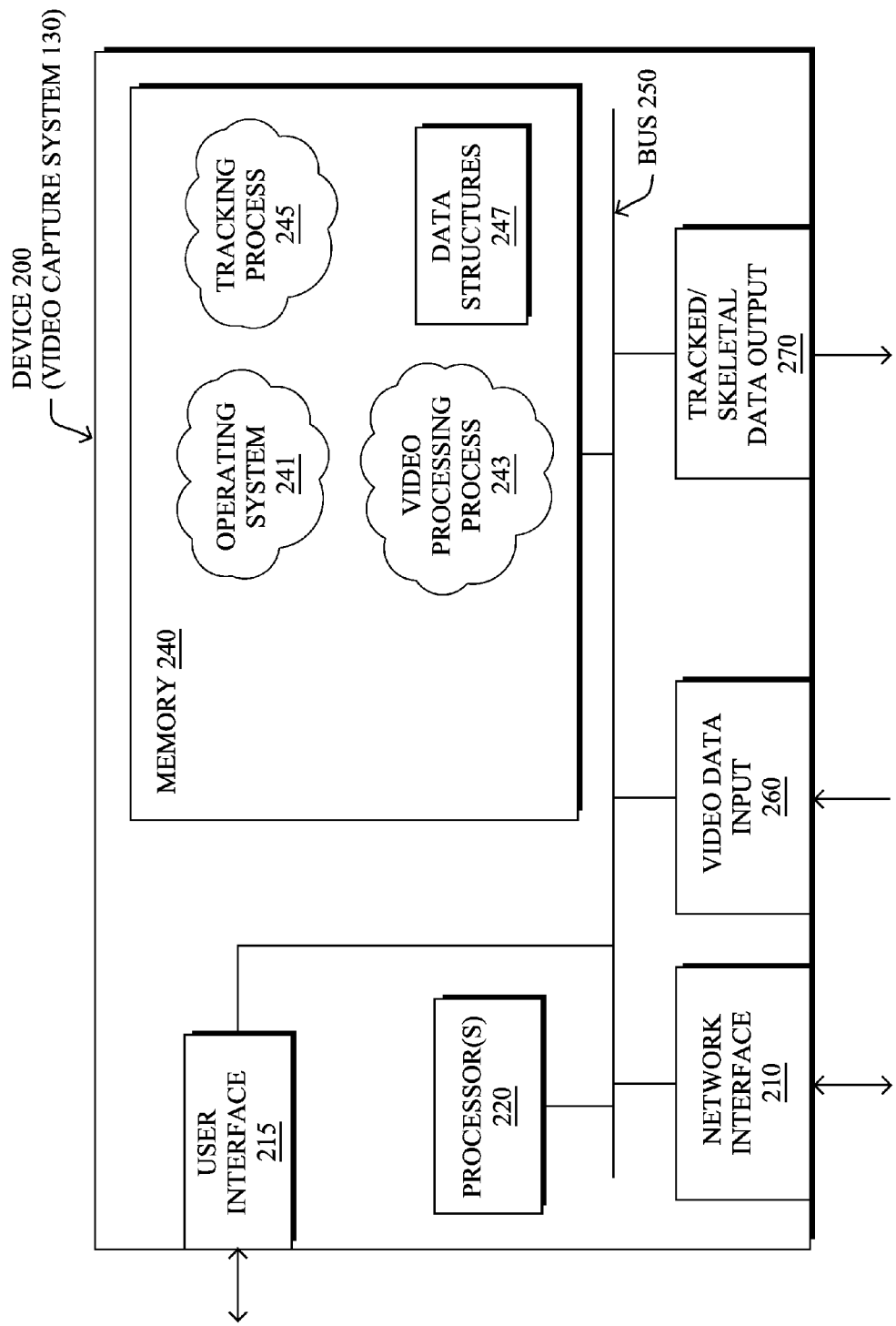
FIG. 2 illustrates an example video processing system that may be used within the avatar control system in accordance with one or more embodiments herein.

FIG. 2 illustrates an example simplified block diagram of a device 200 that represents an illustrative video processing system 130. In particular, the simplified device 200 may comprise one or more network interfaces 210 (e.g., wired, wireless, etc.), a user interface 215, at least one processor 220, and a memory 240 interconnected by a system bus 250. The memory 240 comprises a plurality of storage locations that are addressable by the processor 220 for storing software programs and data structures associated with the embodiments described herein. The processor 220 may comprise hardware elements or hardware logic adapted to execute the software programs and manipulate the data structures 247.

Note that the video processing system device 200 may also comprise a video feed input 260 to receive the video data 115 from the video capture device 110, and a data output 270 to transmit the tracked/skeletal data 135 to the avatar mapping system 150. Note that the inputs and outputs shown on device 200 are illustrative, and any number and type of inputs and outputs may be used to receive and transmit associated data, including fewer than those shown in FIG. 2 (e.g., where input 260 and/or output 270 are merely represented by a single network interface 210).

An operating system 241, portions of which are resident in memory 240 and executed by the processor, may be used to functionally organize the device by invoking operations in support of software processes and/or services executing on the device. These software processes and/or services may comprise, illustratively, such processes as a video processing process 243 and a tracking process 245, among others. In terms of functionality, the processes 243 and 245 contain computer executable instructions executed by the processor 220 to perform various features of the system described herein, either singly or in various combinations. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes and/or applications.

As an example, in accordance with one or more embodiments of the present invention, the hardware and software system used for the video capture device 110 and/or the video processing system 130 may be illustratively based on a KINECT™ system available from MICROSOFT™, and as such, certain terms used herein may be related to such a specific implementation. However, it should be noted that the techniques herein are not limited to a KINECT™ system, and other suitable video capture, skeletal tracking, and processing systems may be equally used with the embodiments described herein. For instance, while the KINECT™ system is configured to detect and relay video and depth information (e.g., a red-green-blue (RGB) camera with infrared (IR) detection capabilities), and also to detect various tracking points based on skeletal tracking algorithms, other suitable arrangements, such as an RGB camera in combination with point trackers placed on a user 120 (as will be understood by those skilled in the art) may also be used in accordance with various techniques herein.

Figure 3:
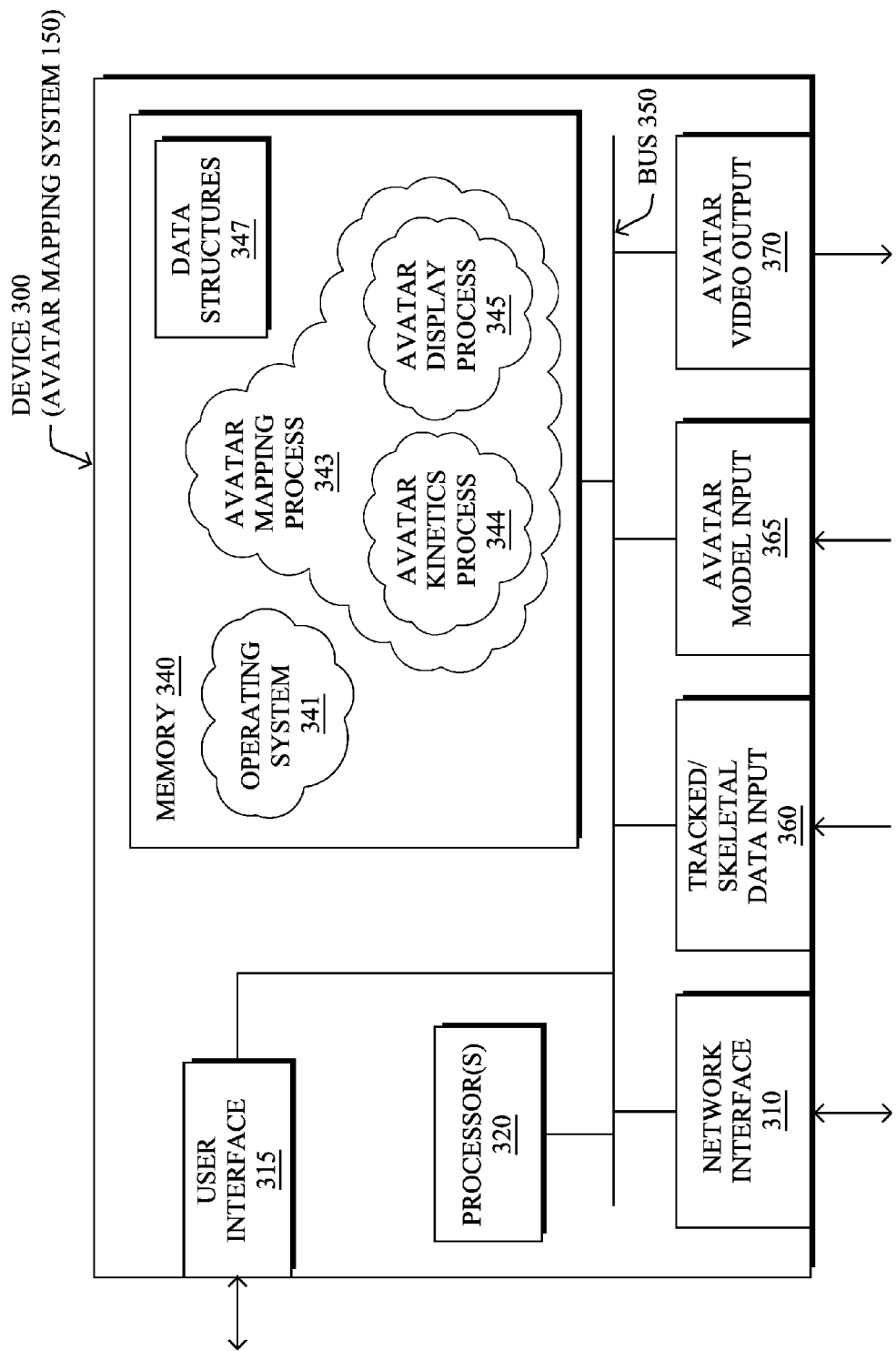
FIG. 3 illustrates an example avatar mapping system that may be used within the avatar control system in accordance with one or more embodiments herein.

FIG. 3 illustrates an example simplified block diagram of a device 300 that represents an illustrative avatar mapping system 150. In particular, the simplified device 300 may comprise one or more network interfaces 310 (e.g., wired, wireless, etc.), a user interface 315, at least one processor 320, and a memory 340 interconnected by a system bus 350. The memory 340 comprises a plurality of storage locations that are addressable by the processor 320 for storing software programs and data structures associated with the embodiments described herein. The processor 320 may comprise hardware elements or hardware logic adapted to execute the software programs and manipulate the data structures 347.

Note that the avatar mapping system device 300 may also comprise a data input 360 to receive the tracked/skeletal data 135 from the video processing system 130, a data input 365 to receive an avatar model 140, and an avatar video output 370 to provide avatar video data 155 to the display 160. Note that the inputs and outputs shown on device 300 are illustrative, and any number and type of inputs and outputs may be used to receive and transmit associated data, including fewer than those shown in FIG. 3 (e.g., where input 360, input 365, and/or output 370 are merely represented by a single network interface 310).

An operating system 341, portions of which are resident in memory 340 and executed by the processor, may be used to functionally organize the device by invoking operations in support of software processes and/or services executing on the device. These software processes and/or services may comprise, illustratively, such processes as an avatar mapping process 343, an avatar kinetics process 344, and an avatar display process 345, among others. In terms of functionality, the processes 343, 344, and 345 contain computer executable instructions executed by the processor 320 to perform various features of the system described herein, either singly or in various combinations. Again, as mentioned above, it will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown in particular configuration, those skilled in the art will appreciate that processes may be separately implemented, and/or may be routines or modules within other processes and/or applications, etc.

According to one aspect of the present invention, avatar mapping process 343, illustratively built on the Unity software platform, takes 3D avatar models/objects 140 (e.g., of "Filmbox" or ".fbx" or "FBX" file type) and maps the model's specified points (e.g., joints) to tracking points (e.g., joints) of the user 120 that are tracked by the video processing system 130 (e.g., video processing process 243 in conjunction with tracking process 245). Once the positions/movements 125 of the user 120 are mapped, user movement may then be mirrored nearly 1-to-1 with the imported virtual model 140, such as for display by avatar display process 345 onto a corresponding display 160, as described herein.

Figure 4A:
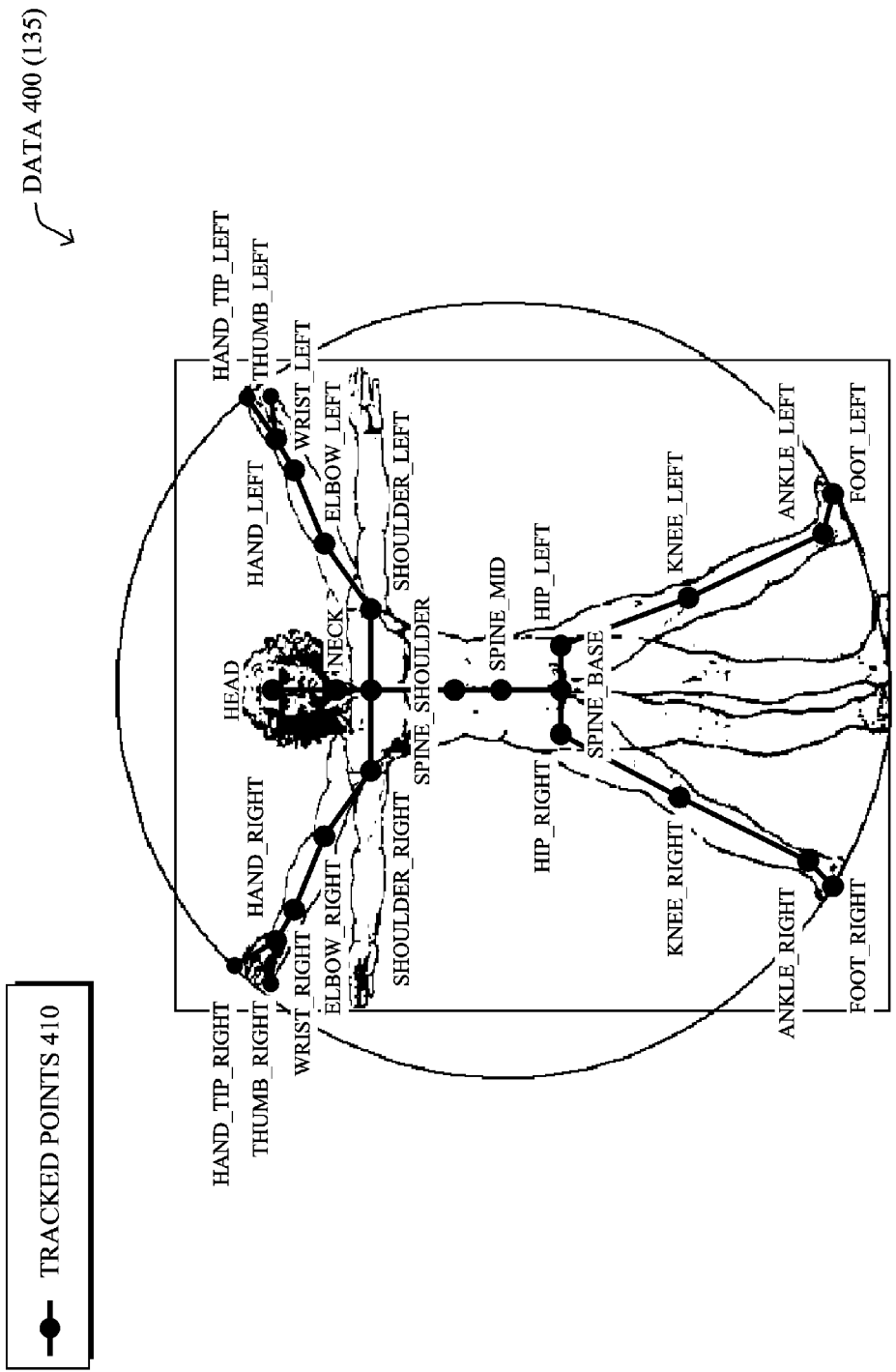

Though various video processing systems 130 can track any number of points, the illustrative system herein (e.g., the KINECT™ system) is able to track twenty-five body joints and fourteen facial joints, as shown in FIGS. 4A and 4B, respectively. In particular, as shown in FIG. 4A, data 400 (video data 115) may result in various tracked points 410 comprising primary body locations (e.g., bones/joints/etc.), such as, e.g., head, neck, spine_shoulder, hip_right, hip_left, etc. Conversely, as shown in FIG. 4B, tracked points 410 may also or alternatively comprise primary facial expression points, such as eye positions, nose positions, eyebrow positions, and so on. Again, more or fewer points may be tracked, and those shown herein (and the illustrative KINECT™ system) are merely an illustrative example.

Notably, the specific technique used to track points 410 is outside the scope of the present disclosure, and any suitable technique may be used to provide the tracked/skeletal data 135 from the video processing system 130. In particular, while FIGS. 4A and 4B illustrate point-based tracking, other devices can be used with the techniques herein that are specifically based on skeletal tracking, which can reduce the number of points needed to be tracked, and thus potentially the amount of processing power needed.

Figure 5A:
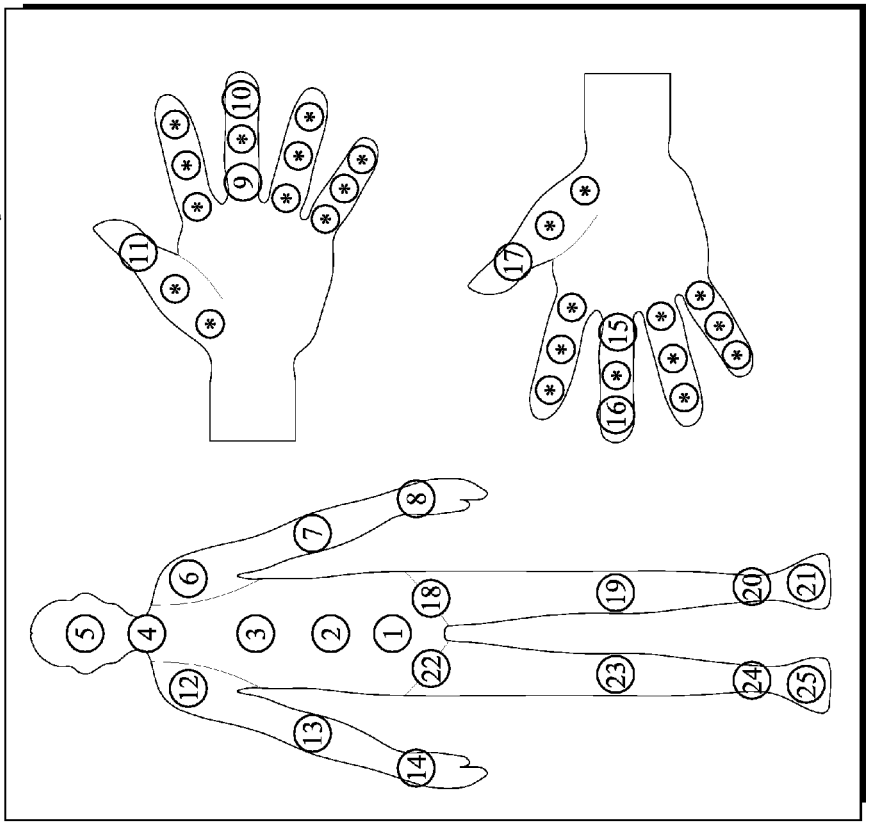
FIGS. 5A-5B illustrate examples of input data points for the avatar mapping system in accordance with one or more embodiments herein.
Figure 5B:
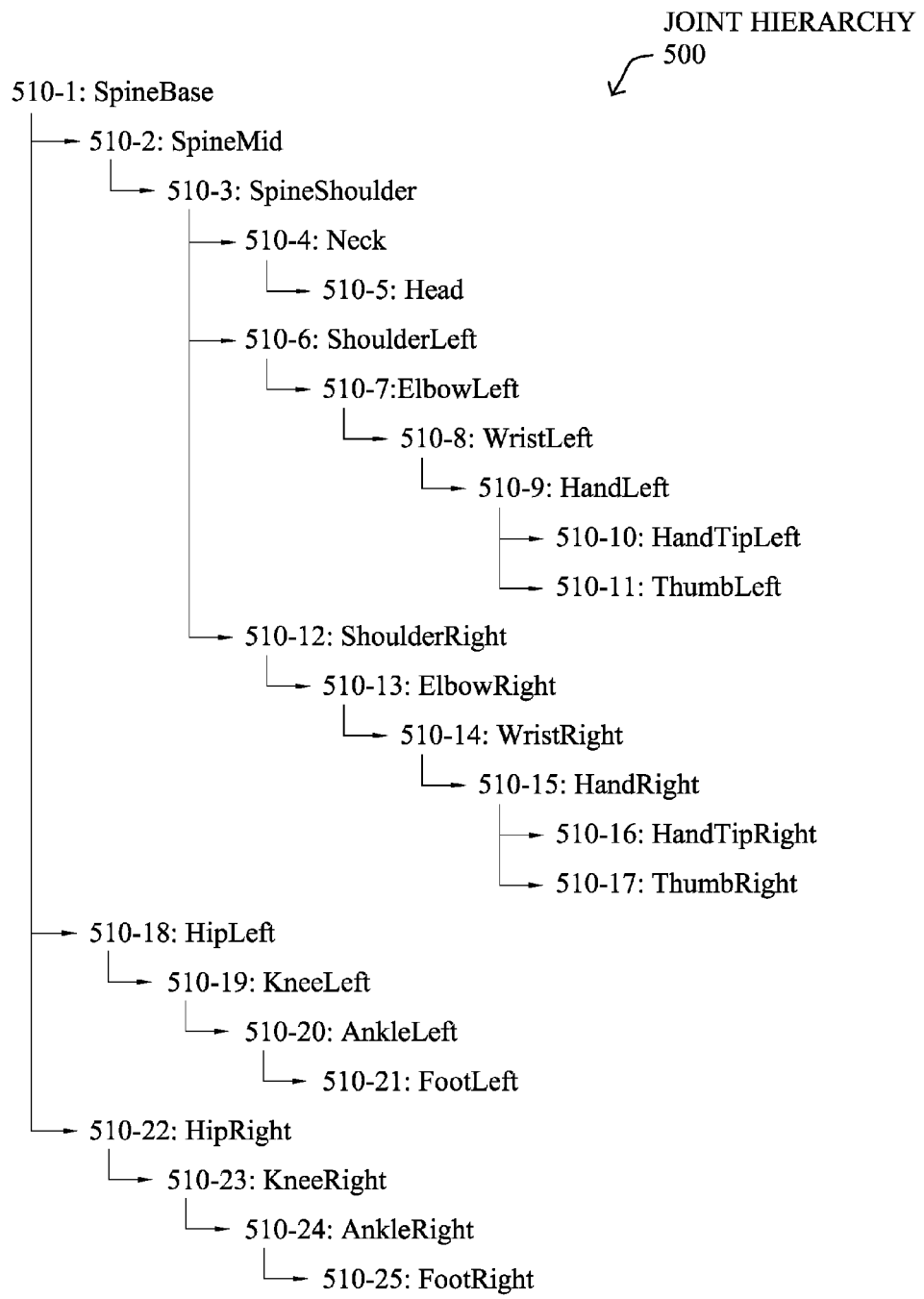

Additionally, as shown in FIG. 5A, the avatar mapping process 343 may define an input hierarchy 500 comprising a set of input points 510, generally depending upon the available tracked points 410 of the video processing system 130, though not necessarily an exact correlation. For instance, assuming that facial feature tracking (FIG. 4B) is not used, the twenty-five input points 510 (labelled in FIG. 5A as 1-25) of an illustrative embodiment may make up a body-part hierarchy as shown in FIG. 5B, where, in particular, the parts comprise points 510-1 through 510-25 as shown and as illustratively labelled. (Note that any naming scheme may be used for the points 510, and the ones shown in FIG. 5B and illustrated herein are merely examples, not meant to be limiting to the scope of the present invention in terms of syntax, format, or actual corresponding physical location on a user and/or avatar.)

As one example (and non-limiting) illustration, a file corresponding to avatar model 140 (e.g., FBX file) is created by a graphic designer, and the corresponding input points 510 may be defined in a manner that aligns with the body-part hierarchy 500, i.e., following the naming scheme/syntax and format. That is, in addition to "skinning" the model 140, meaning giving the model a mesh and skin weights (as will be understood by those skilled in the art), a goal is to track and move the model (e.g., the bones/joints) on the model 140. As such, the FBX file for the model 140 may be pre-configured by design to map certain mapped points of the model 140 to various input points 510 (and thus to tracked points 410) described above.

Alternatively, the avatar mapping process 343 may be configured to allow for the model to be skinned, but not initially mapped. That is, in one embodiment, the avatar mapping process 343 may prompt a user to map points of the avatar model 140 to the input points 510, whether through manually typing in the mapping, or else by displaying the model 140 next to input points 410, and requesting that the user "connect" the desired mapping outcome (e.g., selecting a point of the model 140 to map and then selecting a corresponding input point 510, until all desired mappings were established). Further, in certain embodiments herein, the avatar mapping process 343 may provide a script that can auto-map the points of the model 140 to the input points 510, such as through name search functions (e.g., corresponding to the terms/format used in the hierarchy 500 as described above) or else through hierarchical joint mapping, each described herein.

Figure 6:
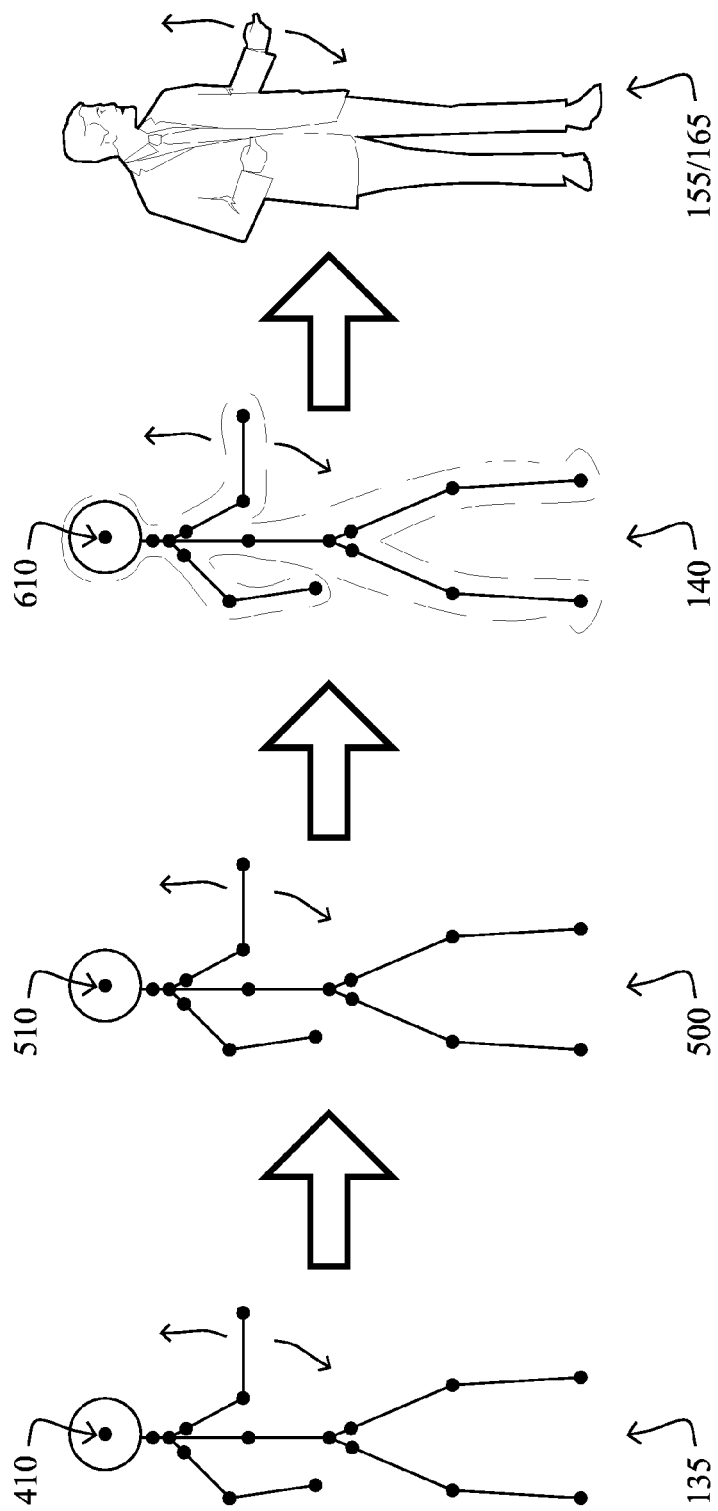
FIG. 6 illustrates an example avatar mapping in accordance with one or more embodiments herein.

The result of the above mapping is demonstrated in FIG. 6, which illustrates a high-level example of the avatar control process through various conversion steps. In particular, the tracked points 410 of tracked/skeletal data 135 are mapped to the input points 510 of the mapping hierarchy 500. The positions/movements of the input points 510 are then applied to the mapped points 610 of the model 140, and the model overlay (skin, mesh, weights, etc.) is then applied to the mapped points 610 and their corresponding positions/movements to create the video data 155 required for displaying the animated avatar 165.

Note that if a model 140 is mapped to fewer mapped points 610 than there are input points 510, then the avatar mapping process 343 can still map the model points 610 provided, and simply ignore the remaining unmapped input points. For instance, though using a model with an equal number of points may provide a better result, not all points are necessary in the imported 3D model for the software to work. For example, a cartoon character may not have elbow joints, so the elbow joint (an input point 510) would simply not be mapped to the character and tracked. (Note that in this example, it is generally irrelevant whether it's the tracked point 410 or the input point 510 corresponding to the elbow that is ignored: there may be various situational and/or computing reasons for doing one or the other.)

Figure 7:
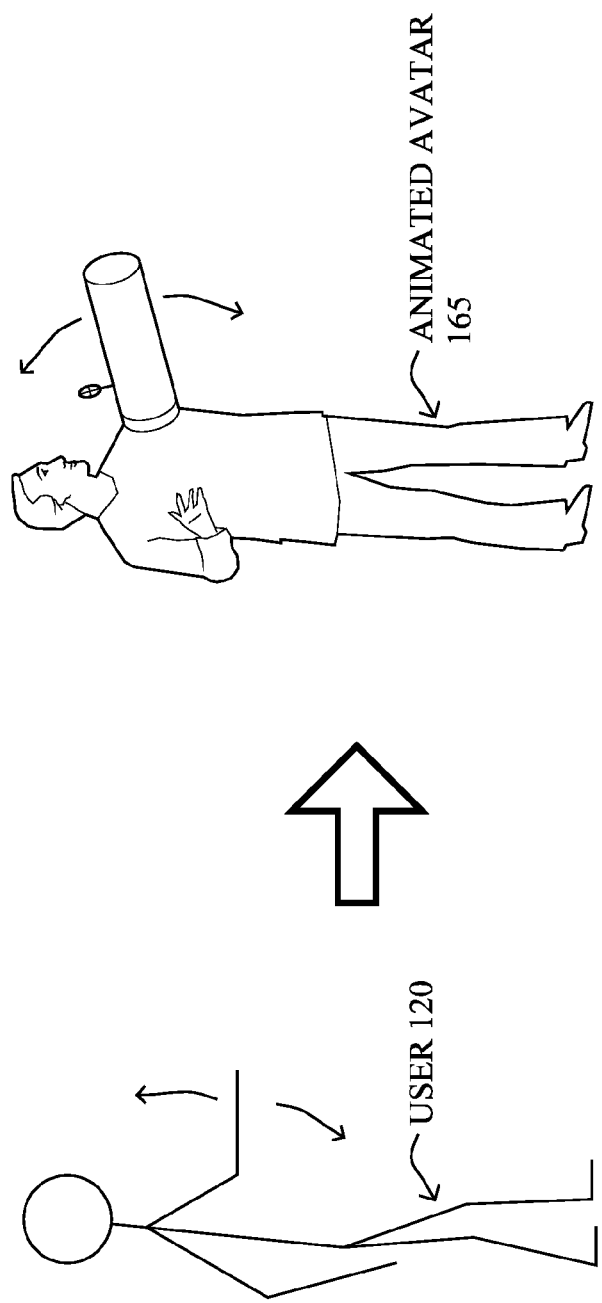
FIG. 7 illustrates an example of a humanoid avatar mapping in accordance with one or more embodiments herein.
Figure 8:
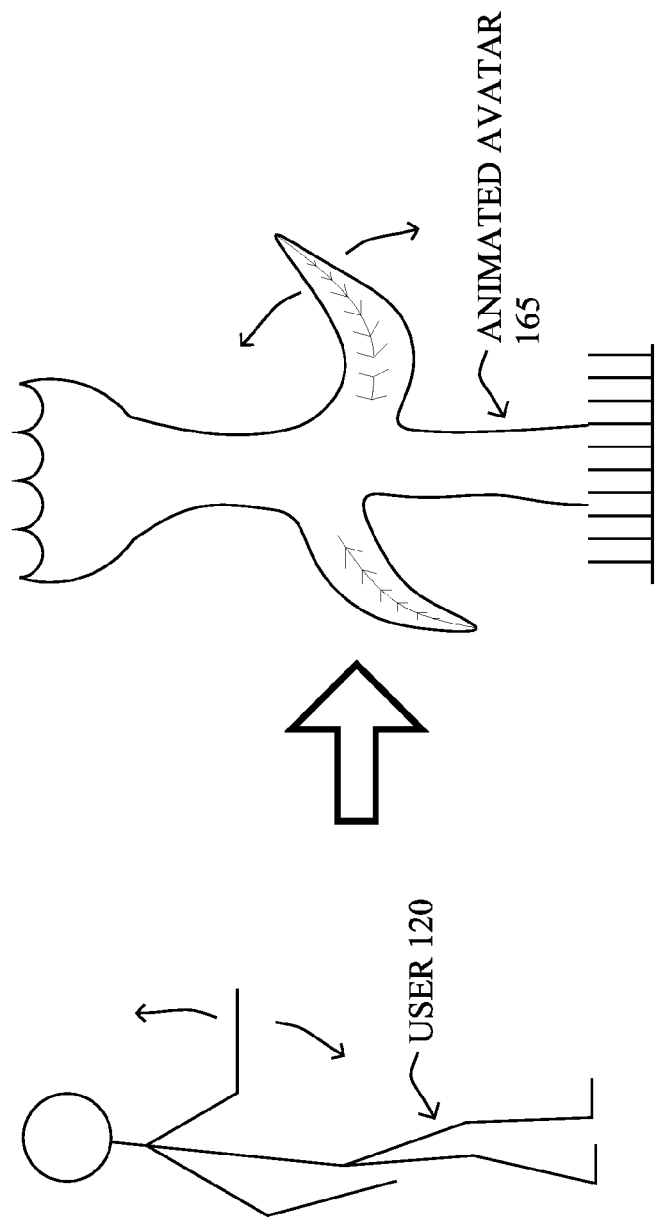
FIG. 8 illustrates an example of a non-humanoid avatar mapping in accordance with one or more embodiments herein.

An example humanoid mapping between the tracked points 410 of a human user 120 and the input points 510 (mapped points 610) for an avatar 165 is shown in FIG. 7. In particular, as shown, a human's tracked points 410 may correspond generally to a graphically designed monster's input points 510, such that basically similar joints/bones are mapped accordingly. Note that the monster has one arm that would otherwise be stiff (e.g., due to it being a weapon), and as such, the human's elbow joint for that arm may remain unmapped. Alternatively, an example non-humanoid mapping is shown in FIG. 8, where a simple flower is used as the model 140 for avatar 165. As such, the human user 120 would not intuitively map to a flower, and the mapping may provide input as to which human tracked points 410 could correspond to which model input points 510/610 to create an anthropomorphized avatar object.

Note that while the mappings shown in FIGS. 7-8 generally conform to a human-like "overlay" mapping (e.g., in FIG. 8, particularly, a spinal mapping to the stem, flower mapping to the head, leaf mapping to the arms, etc.), other types of mapping may also be possible. For example, assuming a model corresponding to a dog, movement of the human's legs could correspond to all four legs of the dog, and movement of the human's right arm could correspond to wagging the tail of the dog, and the left arm could correspond to panting the tongue of the dog. Other, generally inanimate objects, such as buildings, planes, rocks, etc., as well as a plurality of objects (e.g., crowds, teams, rows of objects, etc.) may also have mappings that may either correspond somewhat to an overlay of typical human movement, or else may be entirely differently mapped, as deemed appropriate by the designer. Accordingly, the embodiments herein are not limited to only those general types of objects mapped or their corresponding mappings, and the techniques herein are applicable to any suitably designed model 140.

Moreover, though the embodiments herein are generally described for a single user 120 and a single animated avatar 165, the techniques of the present invention may also be applicable to multiple users and/or multiple avatars. For example, two or more users can each control a corresponding avatar (thus being two or more avatars) on the display 160 at the same time. Also, two or more users can collaboratively control a lesser number of avatars, such as two users controlling a horse avatar, a plurality of users controlling an alien avatar, etc. Lastly, one or more users can control a greater number of avatars, such as a single user controlling two independent avatars (e.g., one for each hand, like puppets), or a single user controlling a plurality of shared-motion avatars (e.g., dance moves correlating to a plurality of dancers, like performing a well-known high leg kick dance routine as a chorus line of many dancers in unison). Accordingly, the examples herein are not meant to be limiting to the number of users or avatars, where certain embodiments herein may thus be similarly directed to mapping and controlling avatars with different numbers of users and/or avatars.

——Interactive Holographic Avatar Control——

As mentioned above, according to one or more embodiments herein, interactive holographic avatar control as described herein allows for avatar control of holograms (holographic avatars), which allows a person to stand next to a holographic projection of a character (e.g., monster, celebrity, anthropomorphized object, etc.) that may be controlled by a second person and interact with it.

Figure 9:
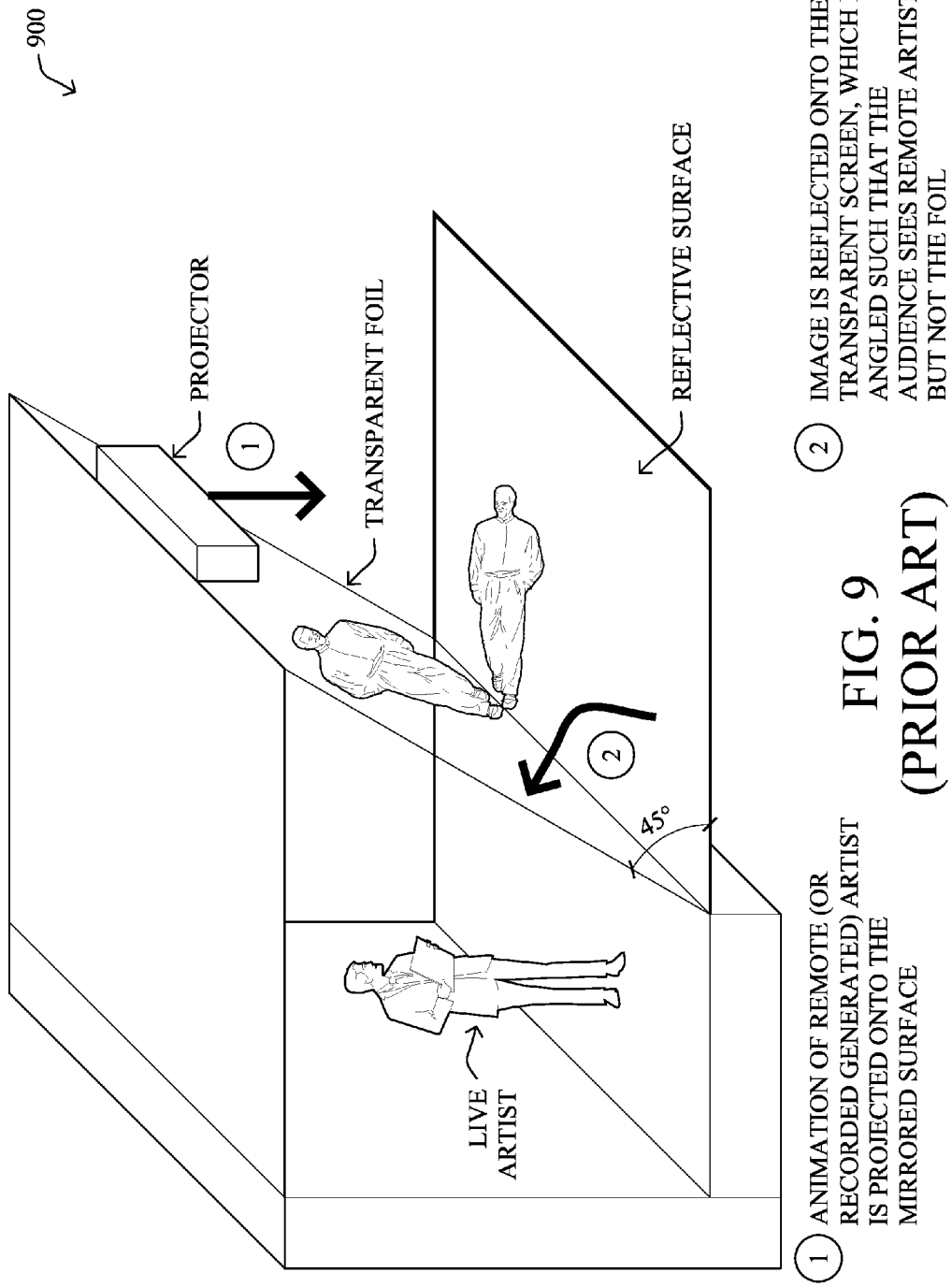
FIG. 9 illustrates an example of holographic projection techniques in accordance with one or more embodiments described herein.

An example holographic projection system according to one or more embodiments described herein generally comprises hardware that enables holographic projections based on the well-known "Pepper's Ghost Illusion". In particular, though many holographic techniques may be used, an illustrative system based on the Pepper's Ghost Illusion is shown in FIG. 9, illustrating an example of a conventional (generally large-scale) holographic projection system 900. Particularly, the streamed (or recorded, or generated) image of the artist (or other object) may be projected onto a reflective surface, such that it appears on a screen angled and the audience sees the artist or object and not the screen (e.g., at approximately 45 degrees). (Note that Pepper's Ghost Illusion was a stage trick in the late 19th Century that used live characters beneath the stage, and not a projected image of characters.) If the screen is transparent, this allows for other objects, such as other live artists, to stand in the background of the screen, and to appear to be standing next to the holographic projection when viewed from the audience.

Figure 10:
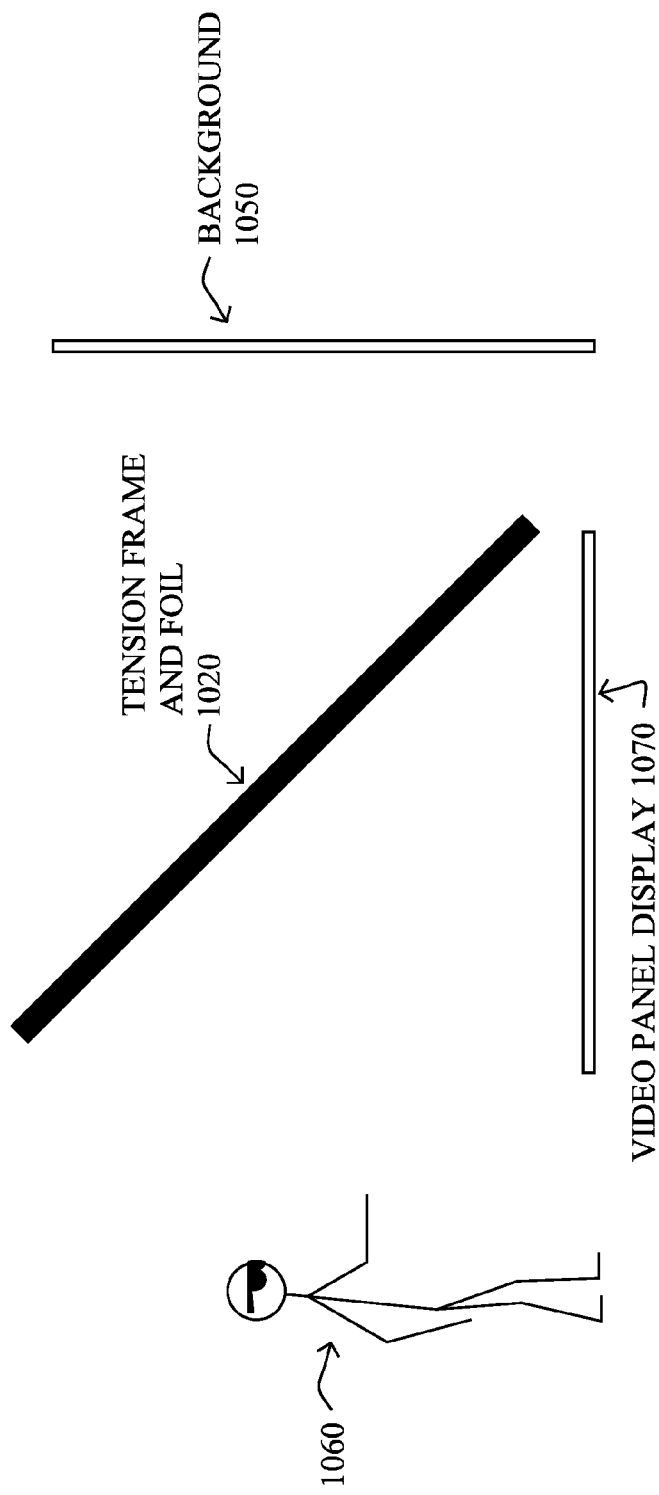
FIG. 10 illustrates an example of a holographic projection system using video panel displays, with the panel below a transparent screen in accordance with one or more embodiments described herein.
Figure 11:
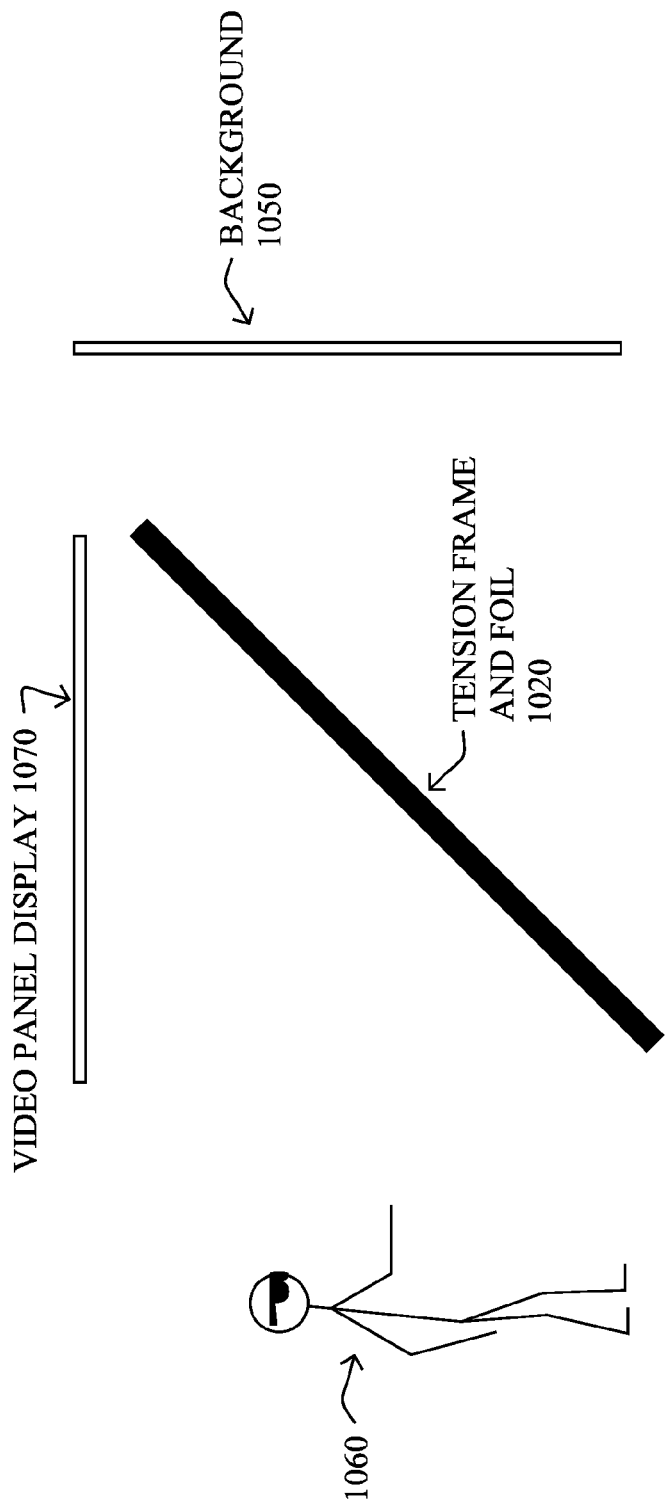
FIG. 11 illustrates an example of a holographic projection system using video panel displays, with the panel above a transparent screen in accordance with one or more embodiments described herein.

In addition to projection-based systems, according to one or more embodiments of the invention herein, and with reference generally to FIGS. 10 and 11, the hologram projection system 1000 may be established with an image source 1070, such as video panel displays, such as LED or LCD panels as the light source. The stick FIG. 1060 illustrates the viewer, that is, from which side one can see the holographic projection in front of a background 1050.

The transparent screen 1020 is generally a flat surface that has similar light properties of clear glass (e.g., glass, plastic such as Plexiglas or tensioned plastic film). As shown, a tensioning frame may be used to stretch a clear foil into a stable, wrinkle-free (e.g., and vibration resistant) reflectively transparent surface (that is, displaying/reflecting light images for the holographic projection, but allowing the viewer to see through to the background). Generally, for larger displays it may be easier to use a tensioned plastic film as the reflection surface because glass or rigid plastic (e.g., Plexiglas) is difficult to transport and rig safely.

The light source itself can be any suitable video display panel, such as a plasma screen, an LED wall, an LCD screen, a monitor, a TV, etc. When an image (e.g., stationary or moving) is shown on the video display panel, such as a person or object within an otherwise black (or other stable dark color) background, that image is then reflected onto the transparent screen (e.g., tensioned foil or otherwise), appearing to the viewer (shown as the stick figure) in a manner according to Pepper's Ghost Illusion.

Figure 12:
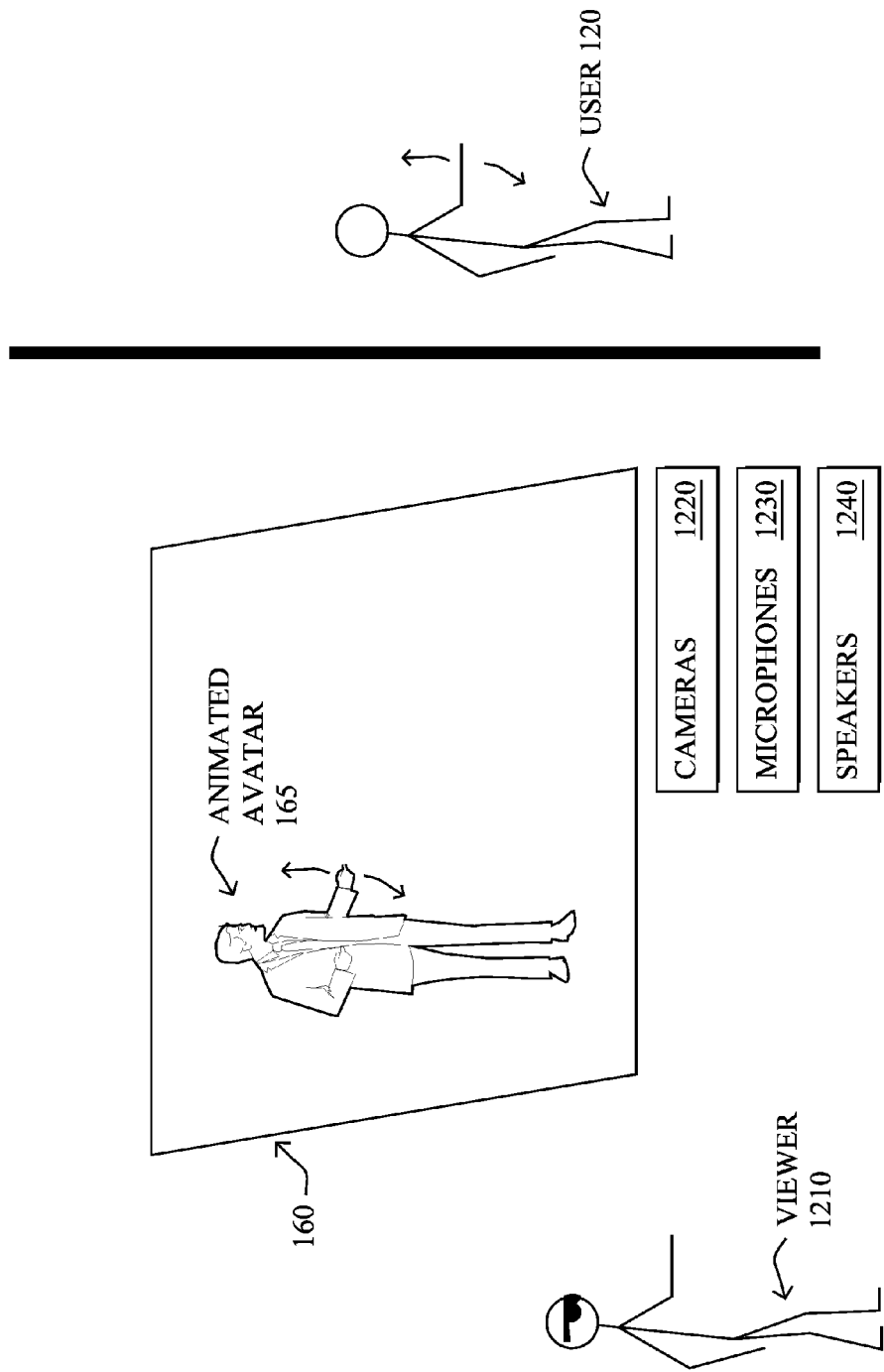
FIG. 12 illustrates an example of a viewer interacting with an avatar that is a holographical projection and is controlled by a user that is either off to the side or in a remote location in accordance with one or more embodiments described herein.

According to the techniques herein, therefore, such holographic projection techniques may be used as display 160 to create an interactive viewer experience. For example, as shown in FIG. 12, a viewer 1210 can interact with a controlled avatar 165 that may be controlled by a user 120, either off to the side or in a remote location. For instance, various cameras 1220, microphones 1230, and speakers 1240 may allow the viewer 1210 to interact with the avatar 165, enabling the controlling user 120 to respond to visual and/or audio cues, hold conversations, and so on. The avatar 165 may be, for example, a celebrity, a fictional character, an anthropomorphized object, and so on.

Note that the user 120 may be replaced by an artificial intelligence engine that is configured to interact with the viewer, such as to respond to various audio or visual responses from the viewer, such as playing a pre-recorded voice dialogue and pre-recorded animations.

Figure 13:
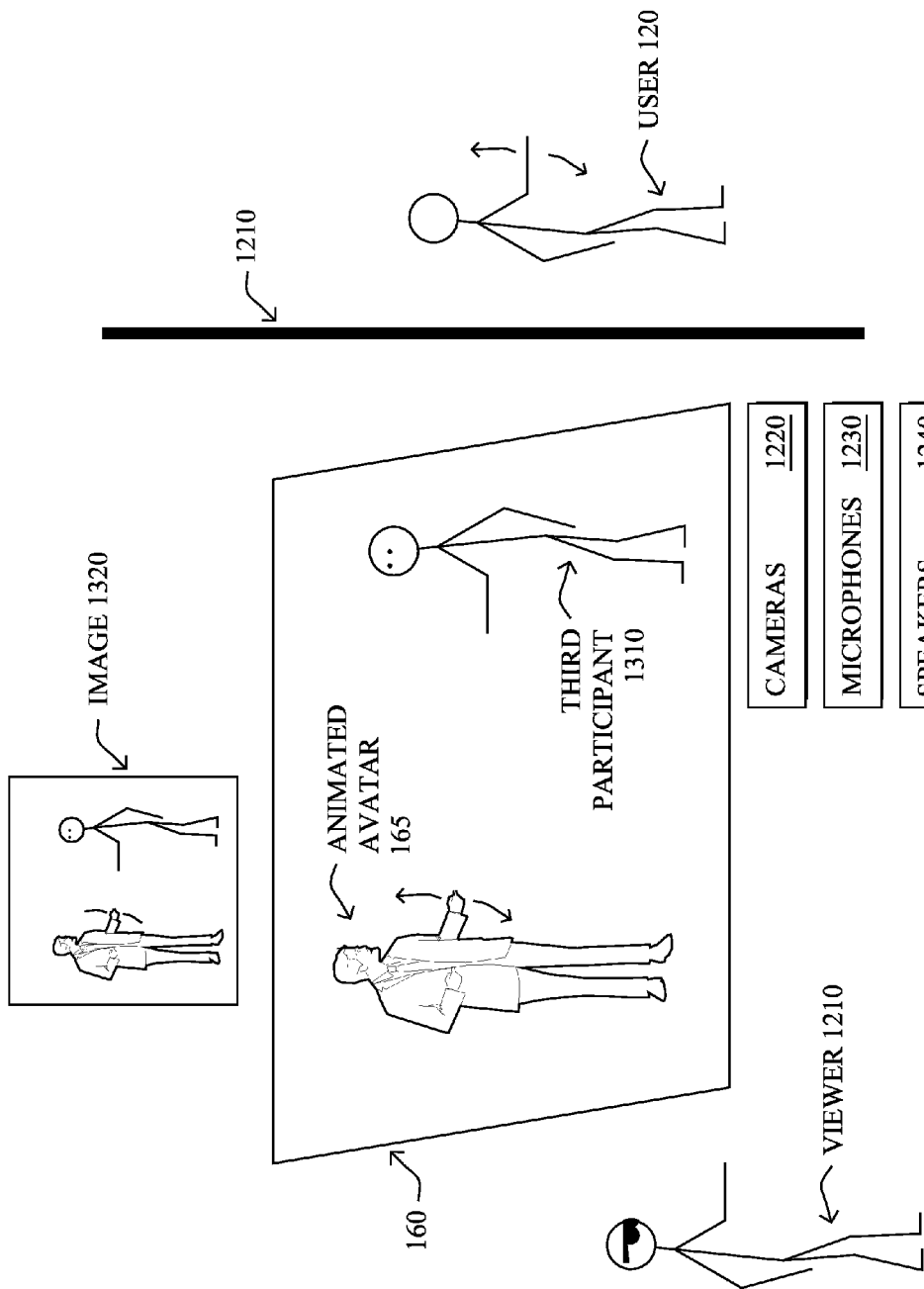
FIG. 13 illustrates an example of a third participant standing behind the holographic projection, creating the illusion to the viewer that the third participant is physically interacting with the holographic controlled avatar in accordance with one or more embodiments described herein.

In addition, as shown in FIG. 13, a third participant 1310 may stand behind the holographic projection, creating the illusion to the viewer 1210 that the third participant is physically interacting with the holographic controlled avatar 165. The third participant may be shown an image 1320 of what the viewer sees in order to allow visual interaction with the avatar 165 (e.g., high-fives, dancing, fighting, etc.).

Figure 14:
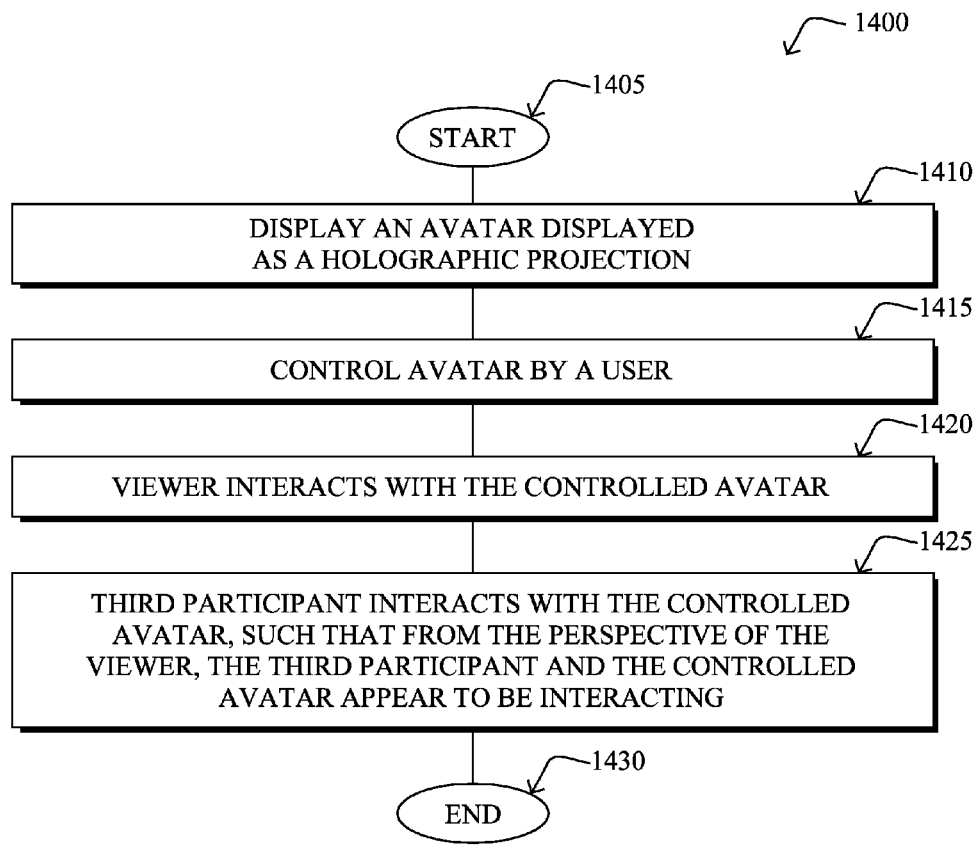
FIG. 14 illustrates an example simplified procedure for interactive holographic avatar control in accordance with one or more embodiments described herein

FIG. 14 illustrates an example simplified procedure for interactive holographic avatar control in accordance with one or more embodiments described herein. The simplified procedure 1400 may start at step 1405, and continues to step 1410, where an avatar is displayed as a holographic projection, and controlled in step 1415 by a user. In step 1420, a viewer may interact with the controlled avatar. Note that in step 1425, a third participant may also interact with the controlled avatar, such that from the perspective of the viewer, the third participant and the controlled avatar appear to be interacting. The procedure illustratively ends in step 1430, though any of the simplified steps may be performed in any order, simultaneously, and without any necessary start or end as described.

It should be noted that while certain steps within procedure 14 may be optional as described above, the steps shown in FIG. 14 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Advantageously, the techniques herein provide for interactive holographic avatar control. In particular, as mentioned above, the techniques described herein allow for avatar control of holograms (holographic avatars), which allows a person to stand next to a holographic projection of a character (e.g., monster, celebrity, anthropomorphized object, etc.) that may be controlled by a second person and interact with it. For instance, the techniques herein allow characters to be brought to life, either with hidden actors controlling the character to interact with the audience or with audience members themselves controlling the character.

——Remote Kinetic Avatar Control——

As noted above, according to one or more embodiments herein, remote kinetic avatar control allows for streaming locally captured (e.g., live or pre-recorded) kinetic data of avatar control movement for remote control of that avatar at a remotely located display. That is, as opposed to streaming the processed avatar video output 155 to a remote location, the techniques herein decrease the bandwidth required for streaming data to a remote location by sending the tracked/skeletal or "kinetic" data 135 to a remote mapping system capable of processing the kinetic data into the animated avatar 165 as described above.

Figure 15A:
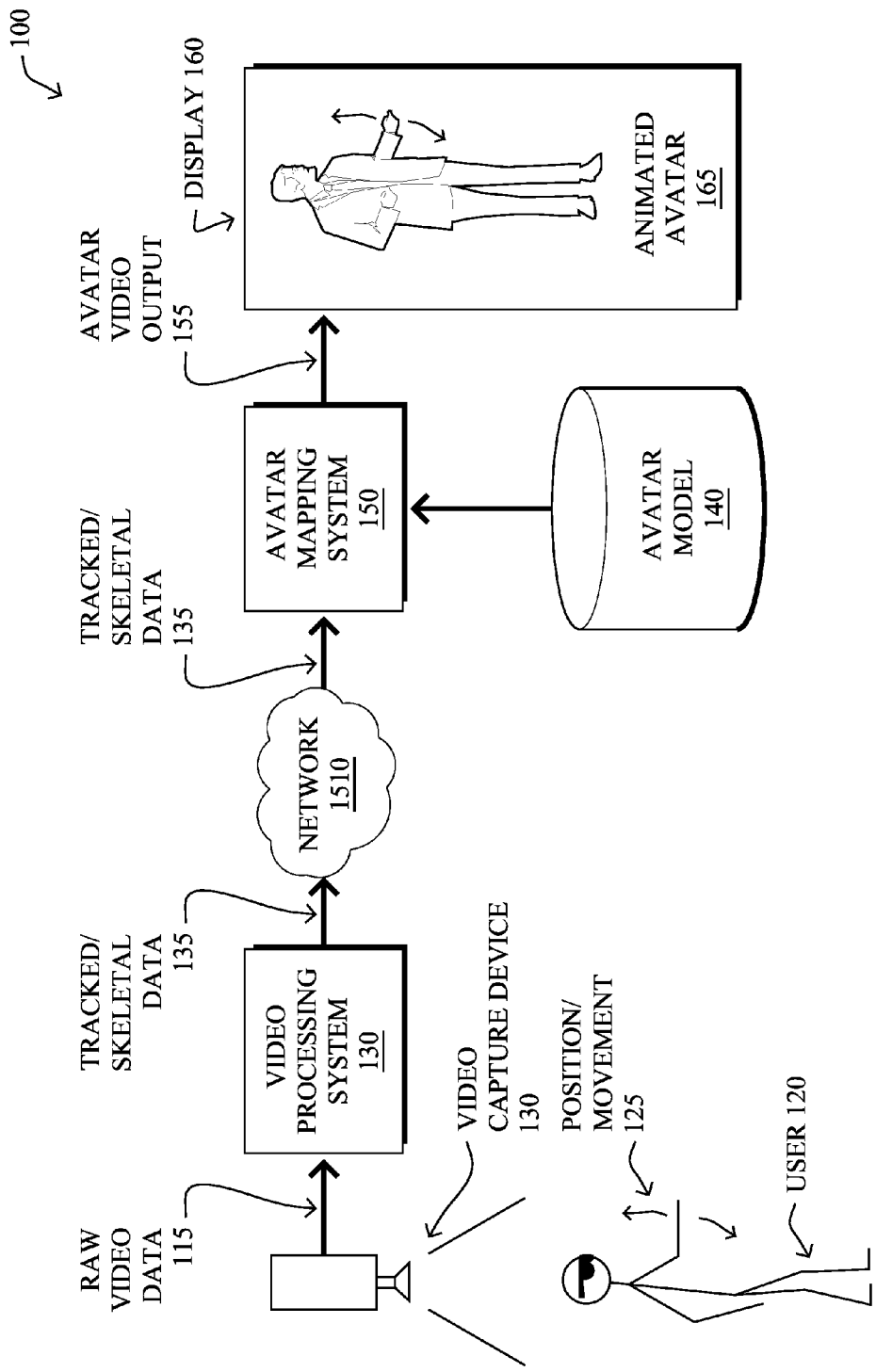
FIGS. 15A-15B illustrate examples of remote kinetic avatar control in accordance with one or more embodiments herein.

As an example, as shown in FIG. 15A, the system 100 of FIG. 1 is physically divided into a first (e.g., local) region and a second (e.g., remote) region, where a user 120 (e.g., stage performer, such as a musician, comedian, orator, etc.) may wish to control a remotely located avatar 165 (e.g., the stage performer having created an avatar model 140 of himself or herself). In the example in FIG. 15A, the video processing system 130 is local, and separated by a network 1510 (e.g., the Internet) from the remote avatar mapping system 150. According to the techniques herein, therefore, only the tracked/skeletal data 135 regarding the tracking points 410 needs to be streamed (transmitted) across the network 1510 to the remote avatar mapping system 150, where the avatar mapping system performs the same functions as described above to produce the animated avatar 165, e.g., based on a locally obtained/stored copy of the associated avatar model 140.

Figure 15B:
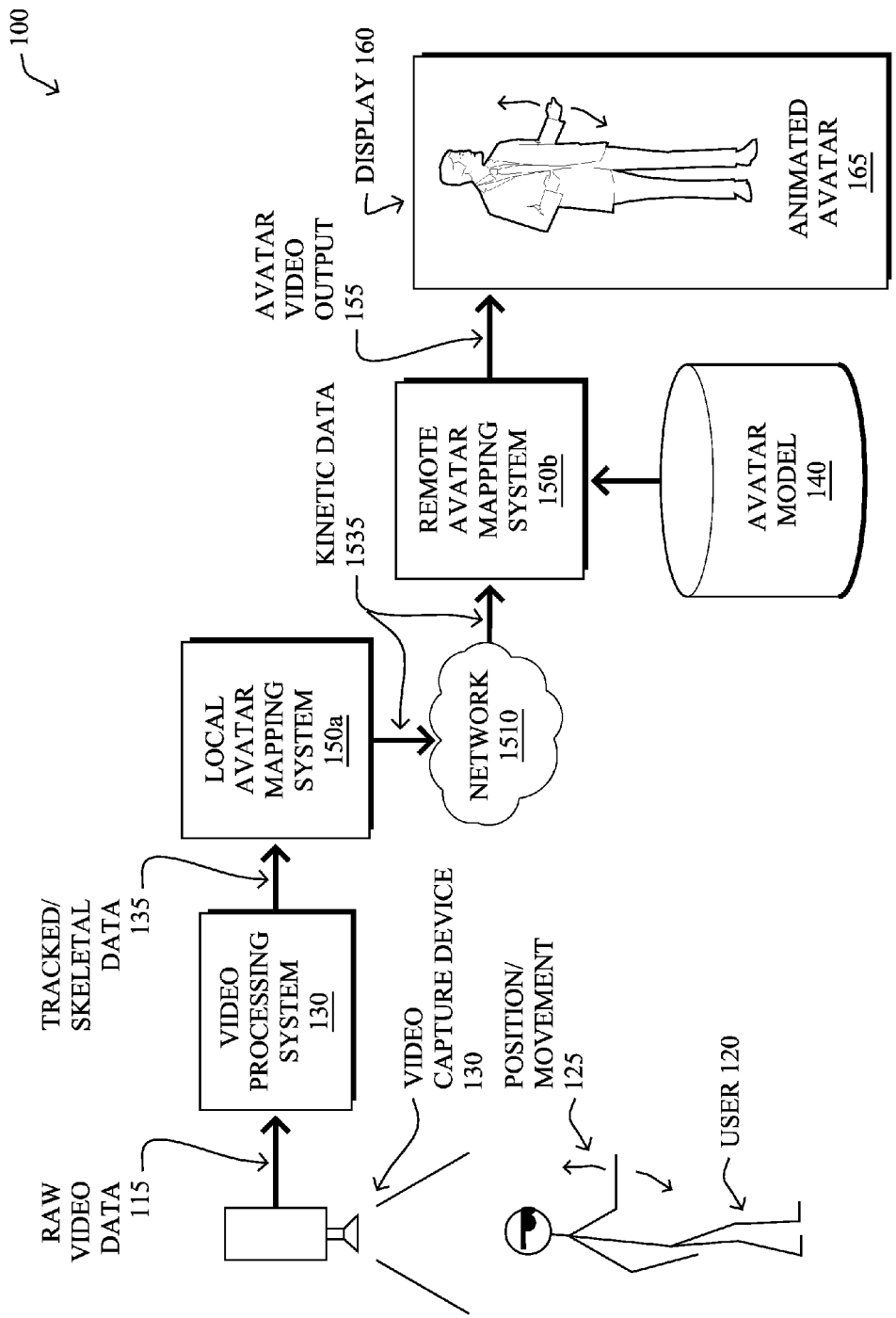

In an alternative example as shown in FIG. 15B, a local avatar mapping system 150a may be located near the video processing system 130, such that the tracked/skeletal data 135 is locally received. In this example, the local avatar mapping system 150a (e.g., avatar kinetics process 344) may be configured to perform the first step of kinetics processing (e.g., tracked points 410 to input points 510). This kinetics data 1535 may then be streamed (transmitted) across the network 1510 to a remote avatar mapping system 150b (e.g., an avatar display process 345), which performs the remainder of the functions as described above to produce the animated avatar 165.

As such, in either example, a live performance in one location (e.g., Los Angeles) could be used to control a holographic projection of the avatar model to likewise perform in a remote second location (e.g., New York) with the exact same movements as the local user (e.g., in Los Angeles). Specifically, according to the techniques described herein, this is possible where no large high resolution files need to be streamed, thus decreasing the bandwidth requirement and associated costs. The ultimate avatar video output transmission 155 between the remote avatar mapping system 150 (150b) and display 160 could therefore be interconnected locally via video protocol communication links (e.g., HDMI, SDI, DVI, etc.).

In addition, in accordance with one particular embodiment of the present invention, the techniques herein may also record/save all movement (kinetic data), whether as the skeletal tracking data 135 or kinetic data 1535 above, which can then be converted by any avatar mapping system 150, regardless of location, for either a post-produced avatar control for a display 160, or else to save a completed avatar animation in various movie files such as .mov, .mp4, or .avi. This removes the need for current Motion Capture systems that require actors to wear multiple accelerometers and stand in front of a green screen. It also eliminates the need for time consuming animation. If further editing of the animation is desired, the pre-imported model may be edited in Motion Builder (or other software) and reimported into the avatar mapping process 343 described above. This greatly reduces the time needed to create life-like characters at a fraction of the cost of current systems.

Figure 16:
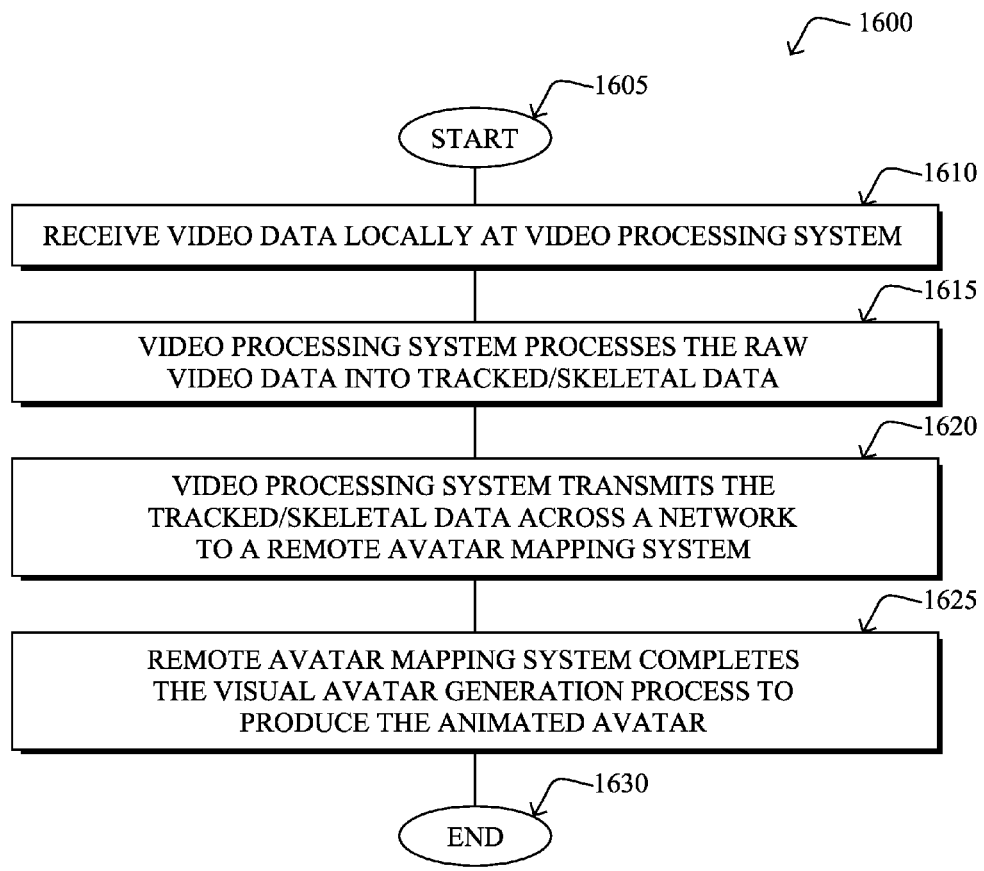
FIG. 16 illustrates an example procedure for remote kinetic avatar control in accordance with one or more embodiments herein.

FIG. 16 illustrates an example simplified procedure for remote kinetic avatar control in accordance with one or more embodiments described herein. The simplified procedure 1600 may start at step 1605, and continues to step 1610, where video data 115 is received locally at video processing system 130, which then processes the raw video data into tracked/skeletal data 135 in step 1615. Then, in one embodiment, in step 1620, the video processing system transmits the tracked/skeletal data 135 (tracking points 410) across a network 1510 to a remote avatar mapping system 150. In step 1625, the remote avatar mapping system 150 may then complete the visual avatar generation process to produce the animated avatar 165. The procedure 1600 then ends in step 1630, notably with the option of continued streaming data and avatar processing.

It should be noted that while certain steps within procedure 1600 may be optional as described above, the steps shown in FIG. 16 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Advantageously, the techniques herein provide for remote kinetic avatar control. In particular, as mentioned above, the techniques described herein can stream locally captured kinetic data of avatar control movement for remote control of that avatar, thus decreasing the bandwidth required for streaming data to a remote location, e.g., for performing telepresence, which also results in a reduced cost. By limiting the amount of data transmitted, the quality of the displayed avatar may also be increased at the remote location, since it is locally processed based on the received kinetic data, and thus won't be subject to hesitation, pixelation, etc., which may be caused by lost or delayed data, as typically found in large data streaming transmissions over long distances. In addition, the embodiments herein may apply these techniques for both live streaming and pre-recorded feed streaming, where the pre-recorded feed may have been further edited post filming.

——Depth-Based User Tracking for Avatar Control——

As mentioned above, according to one or more embodiments herein, depth-based user tracking for avatar control allows for selecting a particular user from a given location that is located within a certain distance from a sensor/camera to control an avatar. For example, when many people are gathered around a sensor or simply walking by, it can be difficult to select one user to control the avatar, and further so to remain focused on that one user. Accordingly, various techniques are described (e.g., depth keying) to set an "active" depth space/range.

In particular, the techniques herein visually capture a person and/or object from a video scene based on depth, and isolate the captured portion of the scene from the background in real-time. For example, as described in commonly owned, co-pending U.S. patent application Ser. No. 14/285,905, entitled "Depth Key Compositing for Video and Holographic Projection" filed on May 23, 2014 by Crowder et al. (the contents of which incorporated by reference herein in its entirety), special depth-based camera arrangements may be used to isolate objects from captured visual images.

Figure 17A:
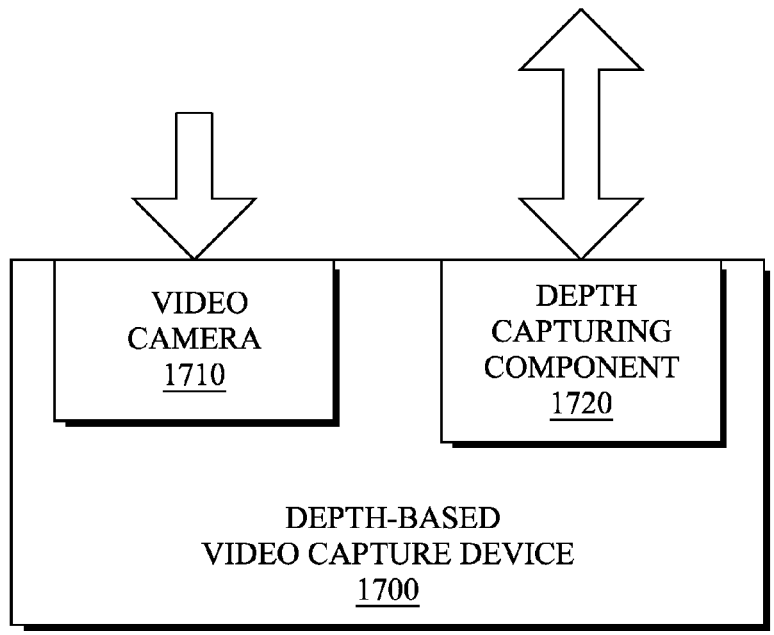
FIGS. 17A-17B illustrate examples of a depth-based video capture device in accordance with one or more embodiments herein.

In order to accomplish depth-based user limiting in this manner, a video capture device used herein may comprise a camera that is capable of detecting object distance. One such example camera that is commercially available is the KINECT™ camera mentioned above, though others are equally suitable. Illustratively, as shown in FIG. 17A, a depth-based video capture device 1700 may comprise two primary components, namely a video camera 1710 and a depth-capturing component 1720. For example, the video camera 1710 may comprise a "red, green, blue" (RGB) camera (also called a color video graphics array (VGA) camera), and may be any suitable rate (e.g., 30 or 60 frames per second (fps)) and any suitable resolution (e.g., 640×480 or greater, such as "high definition" resolutions, e.g., 1080p, 4K, etc.).

Figure 17B:
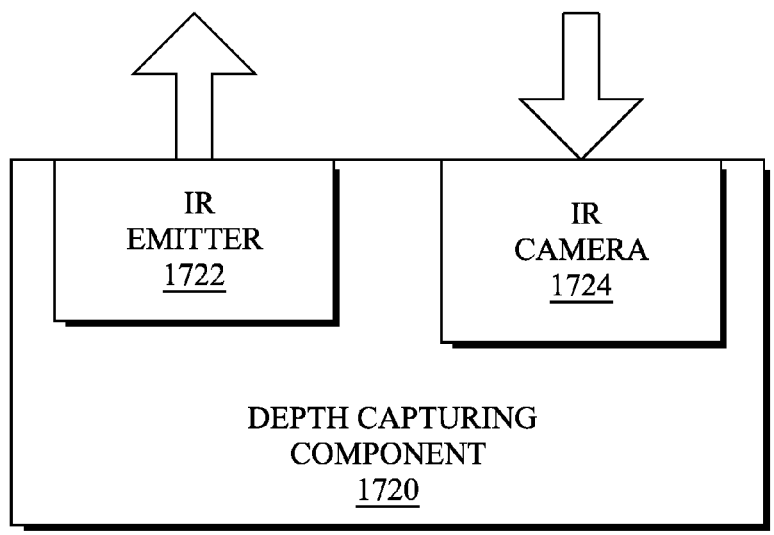

The depth capturing component 1720 may comprise two separate lenses, as illustrated in FIG. 17B, such as an infrared (IR) emitter 1722 to bathe the capture space in IR light, and an IR camera 1724 that receives the IR light from the IR emitter as it is reflected off of the objects within the capture space. For instance, the brighter the detected IR light, the closer the object is to the camera. One specific example of an IR camera is a monochrome CMOS (complimentary metal-oxide semiconductor) sensor. Notably, the IR camera 1724 (or depth capturing component 1720, generally) may, though need not, have the same frame rate and resolution as the video camera 1710 (e.g., 30 fps and 640×480 resolution). Note also that while the video camera 1710 and depth capturing component 1720 are shown as an integrated device, the two components may be separately located (including separately locating the illustrative IR emitter 1722 and IR camera 1724), so long as there is sufficient calibration to collaboratively determine portions of the video image based on depth between the separately located components.

Figure 18A:
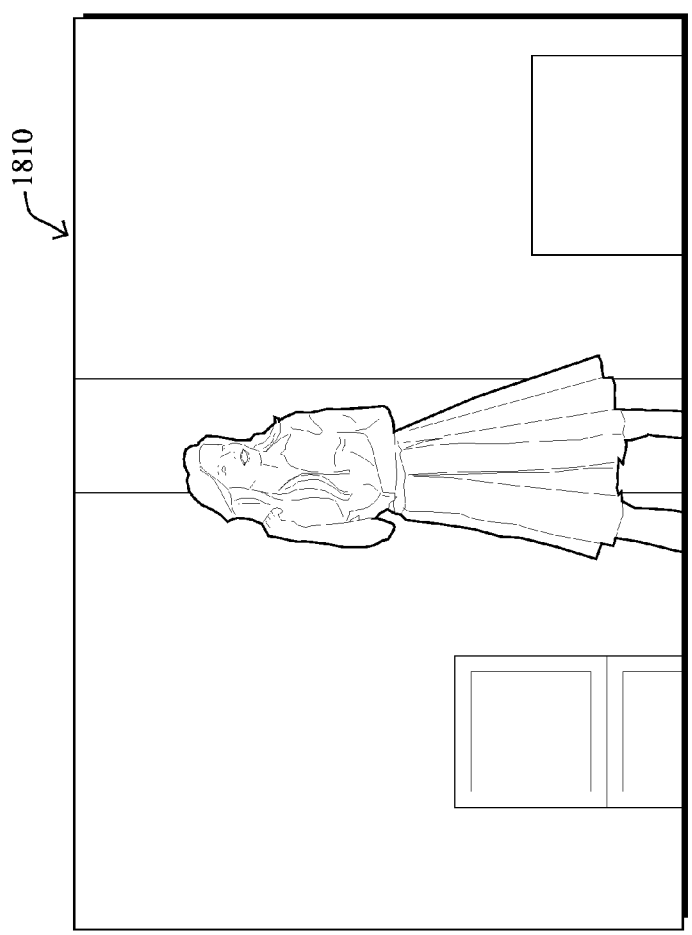
FIGS. 18A-18D illustrate examples of depth-based user tracking in accordance with one or more embodiments herein.
Figure 18B:
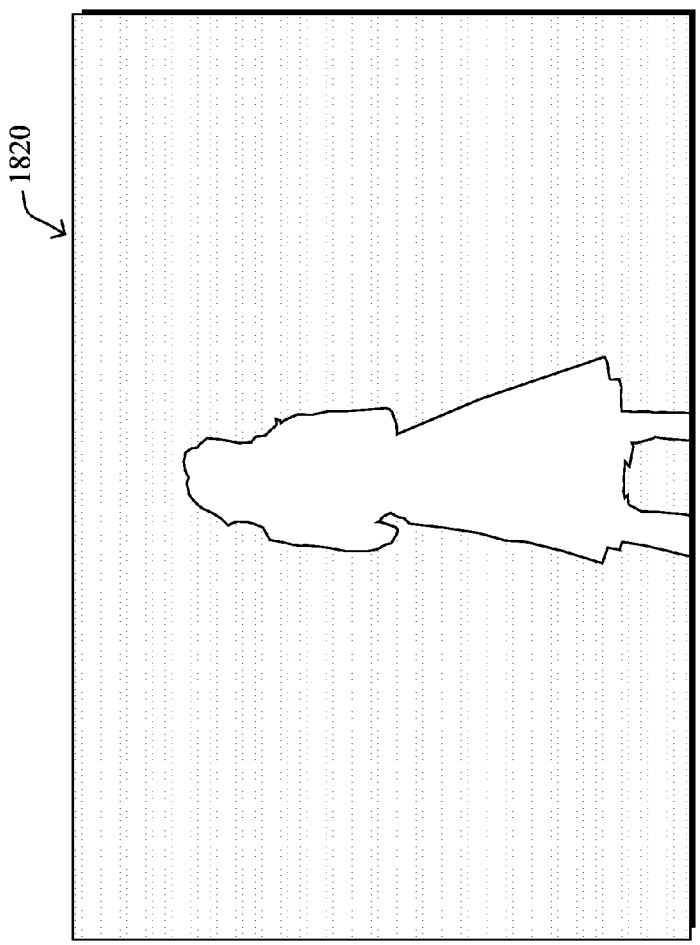

Based on inputting the images from the camera 1700 into the video processing device 130 (200), a corresponding depth differentiating component of the video processing process 245 enables setting/defining a desired depth range (e.g., manually via user interface 215, or dynamically by the process itself) using the captured depth information (e.g., IR information). For example, FIG. 18A illustrates an example source image 1810 that may be captured by the video camera 1710. Conversely, FIG. 18B illustrates an example depth-based image 1820 that may be captured by the depth capturing component 1720, such as the IR image captured by the IR camera 1724 based on reflected IR light from the IR emitter 1722. In particular, the image 1820 in FIG. 18B may be limited (manually or dynamically) to only show the desired depth range of a given subject (person, object, etc.), such as based on the intensity of the IR reflection off the objects.

Figure 18C:
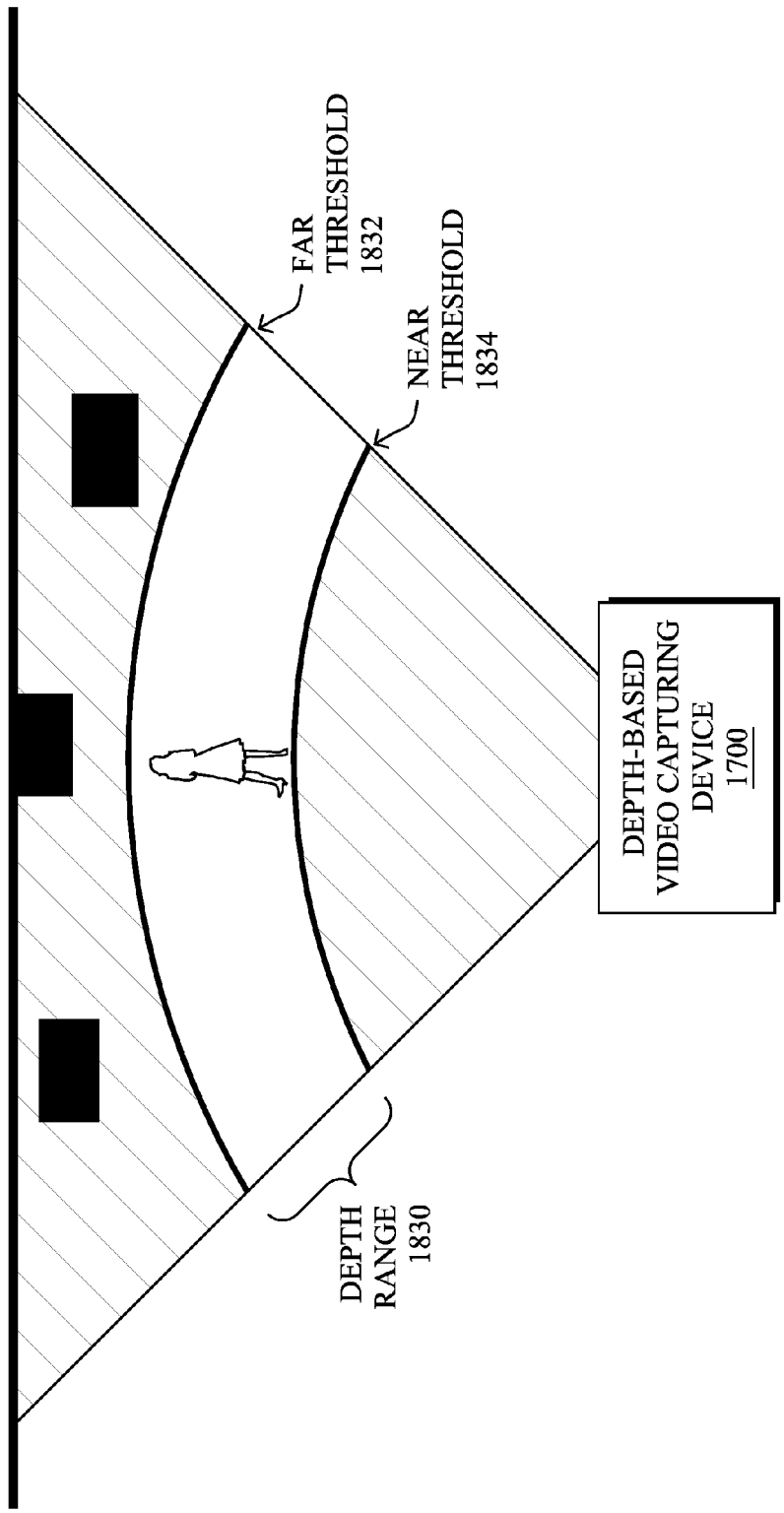

According to one or more embodiments herein, the depth range selected to produce the image 1820 in FIG. 18B may be adjusted on-the-fly (e.g., manually by a technician or dynamically based on object detection technology) in order to control what can be "seen" by the camera. For instance, the techniques herein thus enable object tracking during live events, such as individual performers move around a stage. For example, as shown in FIG. 18C, an aerial view of the illustrative scene is shown, where the desired depth range 1830 may be set by a "near" depth threshold 1834 and a "far" depth threshold 1832. As an example, a user may be prompted to press the '−' or '+' keys on a keyboard to decrease and increase the near threshold, respectively, and the '<' or '>' keys to correspondingly decrease and increase the far threshold, respectively. Other techniques (and particularly user inputs/keys) may be made available, such as defining a center depth (distance from camera) and then a depth of the distance captured surrounding that center depth, or defining a near or far depth threshold and then a further or nearer depth (in relation to the near or far depth threshold), respectively. This can also be combined with other body tracking algorithms (e.g., as described below).

Figure 18D:
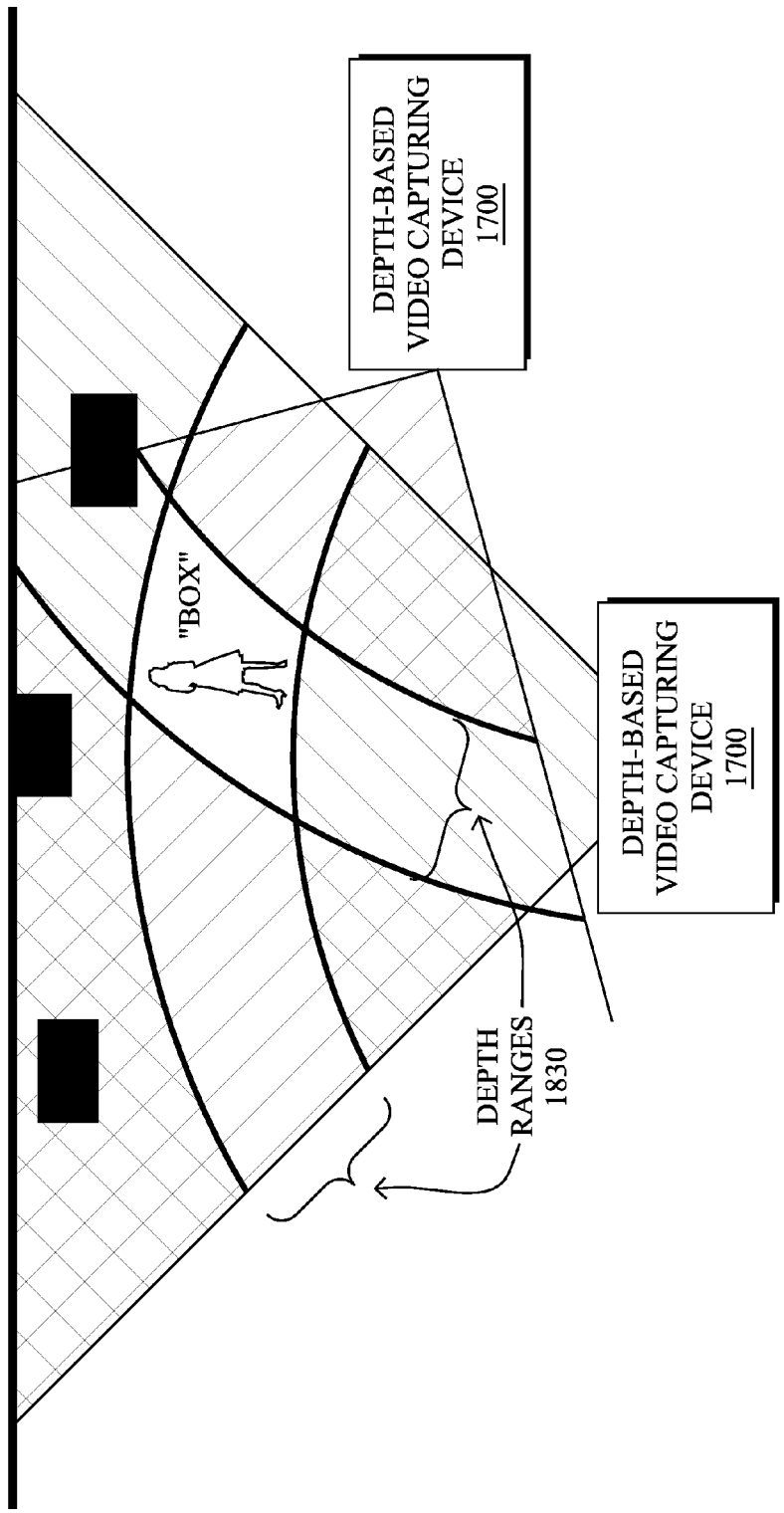

Also, as shown in FIG. 18D, multiple depth sensors could be used to further define the "active" region, e.g., placing a depth sensor on the side of the subject area so that a more clearly-defined "box" could be defined as the "active" area (i.e., the intersection of depth ranges between the two sensors).

By then overlaying the depth information (IR camera information) of image 1820 in FIG. 18B with the video image 1810 from FIG. 18A, the techniques herein "cut out" anything that is not within a desired depth range, thus allowing the camera to "see" (display) whatever is within the set range. In this manner, the background image may be removed, isolating the desired person/object (user 120) from the remainder of the visual scene captured by the video camera 1710. (Note that foreground images may also thus be removed.)

By maintaining a consistent depth range 1830, a mobile object or person may enter or exit the depth range, thus appearing and disappearing from view. At the same time, however, by allowing for the dynamic and real-time adjustment of the depth range as mentioned above, a mobile object or person may be "tracked" as it moves in order to maintain within the depth range, accordingly.

Notably, in one embodiment as mentioned above, body tracking algorithms, such as skeletal tracking algorithms, may be utilized to track a person's depth as the person moves around the field of view of the cameras. For example, in one embodiment, the perspective (relative size) of the skeletally tracked individual(s) (once focused on that particular individual within the desired depth range) may result in corresponding changes to the depth range: for instance, a decrease in size implies movement away from the camera, and thus a corresponding increase in focus depth, while an increase in size implies movement toward the camera, and thus a corresponding decrease in focus depth. Other skeletal techniques may also be used, such as simply increasing or decreasing the depth (e.g., scanning the focus depth toward or away from the camera) or by increasing the overall size of the depth range (e.g., moving one or both of the near and far depth thresholds in a manner that widens the depth range).

In an alternative embodiment, if body tracking is enabled, the set depth range may remain the same, but a person's body that leaves that depth range may still be tracked, and isolated from the remaining scene outside of the depth range. For instance, body tracking algorithms may be used to ensure a person remains "captured" even if they step out of the specified depth range, allowing for certain objects to be left in the depth range for capture while a person has the freedom to move out of the depth range and still be captured. As an example, assume in FIG. 18C that there was an object, such as a chair, within the specified depth range 1830. If the person were to step out of the depth range 1830 while body tracking in this embodiment was enabled, the chair would remain in the isolated portion of the scene, as well as the person's body, regardless of where he or she moved within the captured image space. On the contrary, in the embodiment above where the body tracking adjusts the depth range, the chair may come into "view" of the dynamically adjusted depth range 1830 and become part of the isolated image only when the person moves to a depth corresponding to the chair.

Accordingly, with either type of body tracking enabled, an operator would not need to manually adjust the min/max depth to retain performers in a scene. For example, once the depth range is set, if body tracking is enabled and a person moves out of the depth range, they will still be tracked and included within the cut-out footage, whether by dynamically adjusting the depth range, or else by specifically following the person's body throughout the captured scene. (Note that the manual depth adjustments or "sliders" to set the near and far thresholds may remain available for including non-body objects in the scene.)

Figure 19:
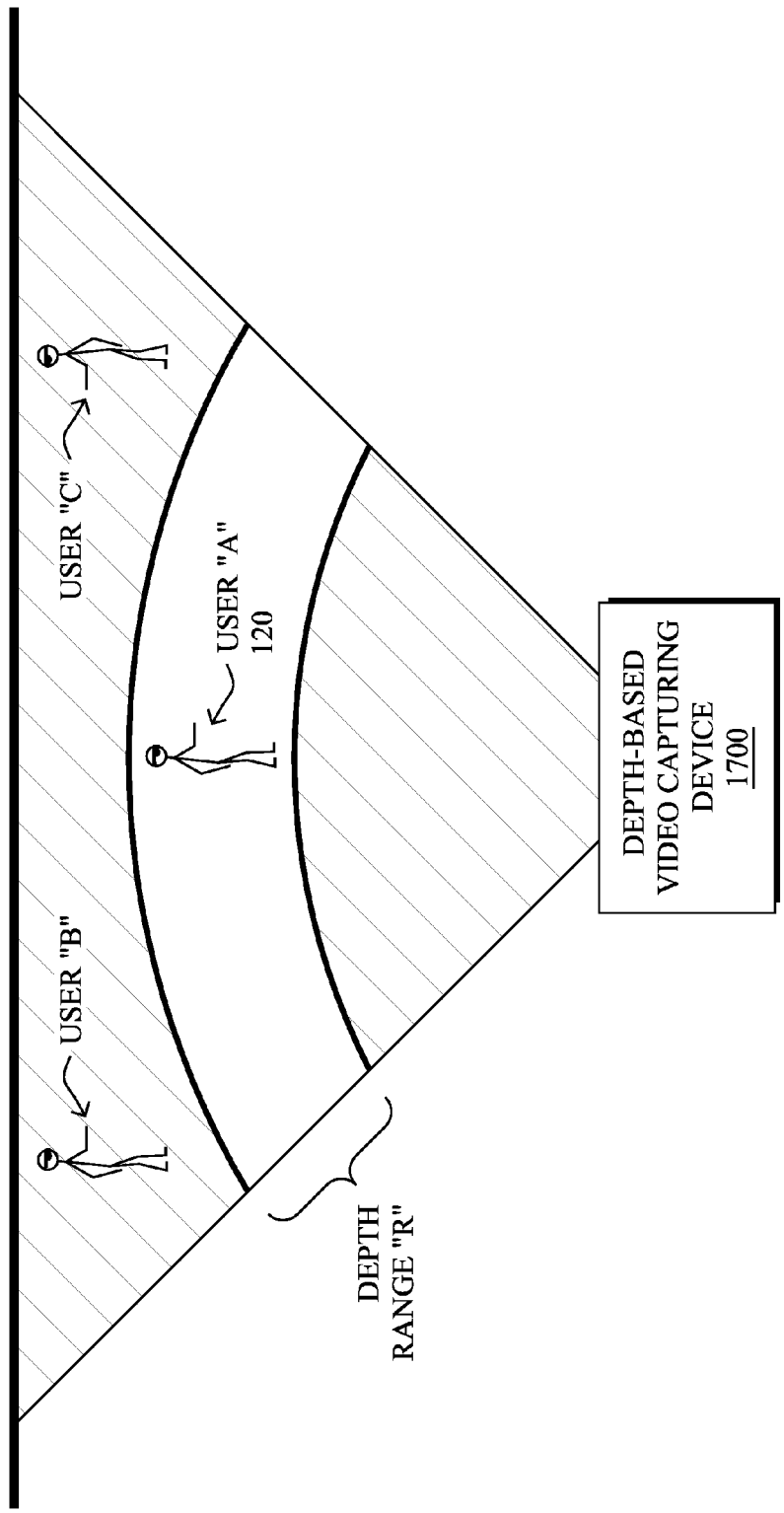
FIG. 19 illustrates an example of depth-based user tracking for avatar control.

In accordance with the embodiments of the present invention, therefore, and as illustrated in FIG. 19, depth-based user tracking allows for selecting a particular user (e.g., "A") from a given location that is located within a certain distance (depth range "R") from a sensor/camera to control an avatar, and not any other users (e.g., "B", "C", etc.) not within that range. In this manner, user tracking algorithms may function with reduced "noise" from other potential user candidates to control the avatar 165. In addition, use of the depth range allows for the system to "activate" only when a user is located within the range "R" (e.g., 2-10 feet from the camera/sensor), allowing the system to remain idle until a user is located nearby.

Figure 20:
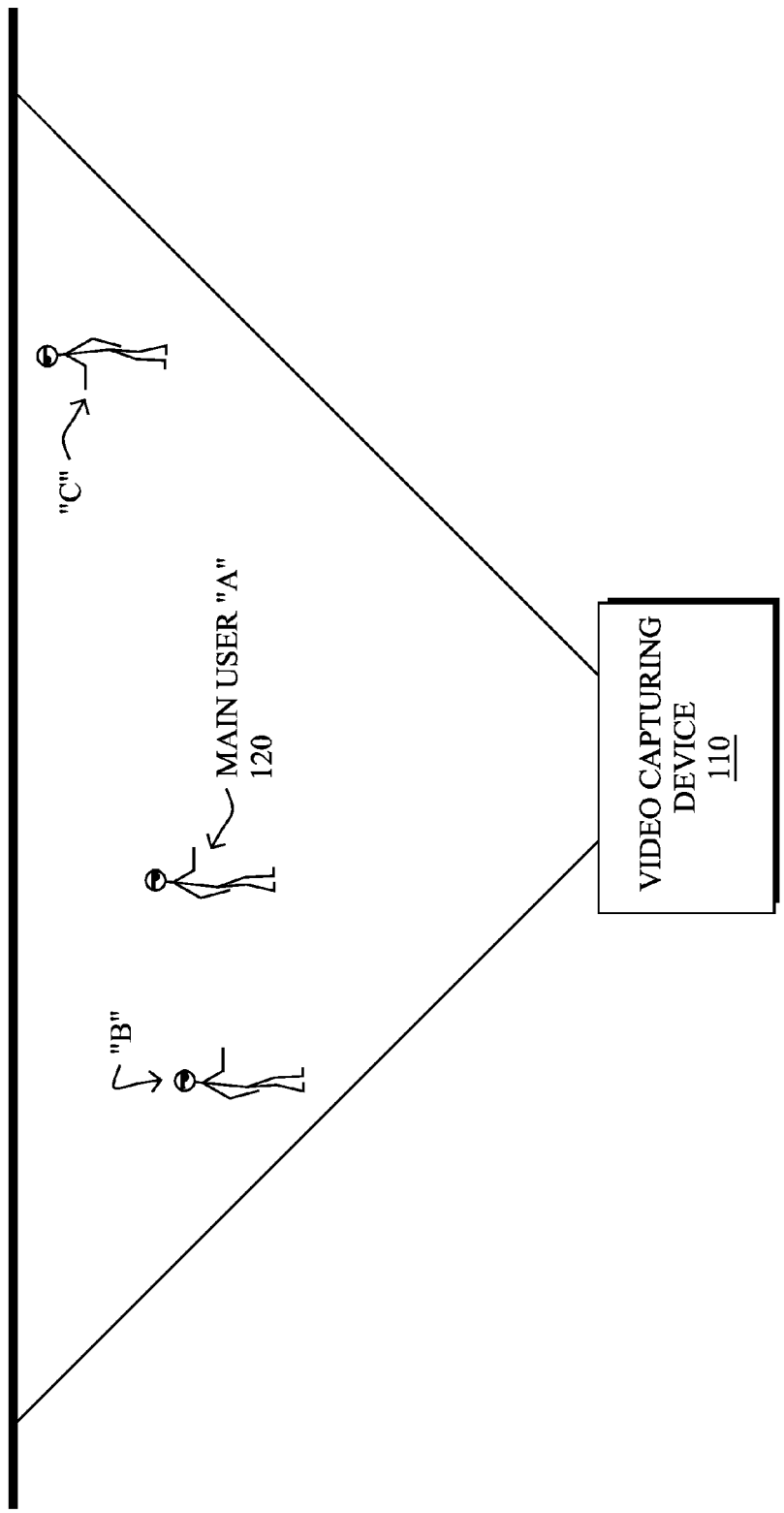
FIG. 20 illustrates an example of sequential skeletal user tracking for avatar control.

In an additional embodiment, once a user is selected, that user remains as the selected user in control of the avatar, while other users may still be tracked in the background (e.g., within the active depth space) until the selected user is no longer tracked (e.g., steps out of view of the sensor). At this time, a subsequent user may be selected to control the avatar. For example, as shown in FIG. 20, once a user steps in front of the camera 110 and is recognized/tracked, they are given a UserId (e.g., by the video processing system 130) that is not lost until that person is no longer tracked. Using this, the techniques herein define a "Main User" variable which is set once the first person is tracked (e.g., user "A"), and is only changed when that person leaves/is untracked. At this point the "Main User" switches to the next tracked person (UserId's are in chronological order from first to last tracked), if any (e.g., users "B" or "C"), or waits until the next person is tracked. Generally, this technique, in addition to or as an alternative to the depth-based technique above, prevents tracking interruption when others walk by the primary tracked user.

Figure 21:
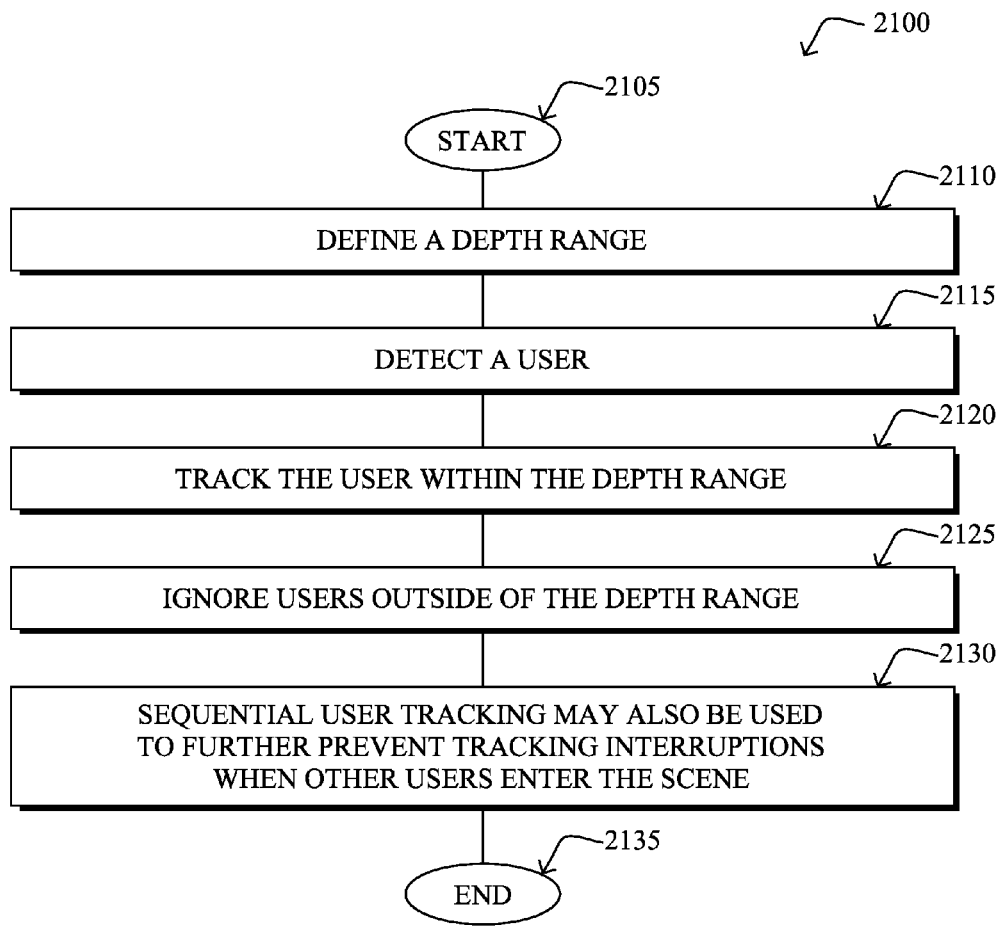
FIG. 21 illustrates an example simplified procedure for depth-based user tracking for avatar control in accordance with one or more embodiments described herein.

FIG. 21 illustrates an example simplified procedure for depth-based user tracking for avatar control in accordance with one or more embodiments described herein. The simplified procedure 2100 may start at step 2105, and continues to step 2110, where a depth range is defined in order to detect a user 120 in step 2115. (Note that the order of these steps may be specifically reversed: that is, detecting a user 120, and then defining the depth range based on the detected user). In step 2120, the user is tracked within the depth range, allowing for users outside of the depth range to be ignored in step 2125. Also, as noted above, optionally in step 2130, sequential user tracking may also be used to further prevent tracking interruptions when other users enter the scene (e.g., the depth range or otherwise). The simplified procedure 2100 ends in step 2135, notably with the option to continue any of the steps above (e.g., detecting users, adjusting depth ranges, tracking users, etc.).

It should be noted that while certain steps within procedure 2100 may be optional as described above, the steps shown in FIG. 21 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Advantageously, the techniques herein provide for depth-based user tracking for avatar control. In particular, as mentioned above, the techniques described herein select a particular user that is located within a certain distance from the sensor/camera to control an avatar, such that when many people are gathered around a sensor or simply walking by, the techniques alleviate the difficulty in selecting just the one user and to remain focused on that one user. Also, user tracking may be further refined by selecting a user that remains tracked while in control of the avatar, preventing tracking interruption when others walk past the selected user (e.g., though other users may still be tracked in the background and allowed to control the avatar once the selected user is no longer tracked).

——Enhanced Avatar Kinetic Movement Interpolation——

As mentioned above, according to one or more embodiments herein, enhanced avatar kinetic movement interpolation allows for extrapolation of kinetic data in a manner that infers direction of a user's body parts to make an avatar move more accurately based on a user's physical movements. For instance, as detailed below, pre-programmed calculations (e.g., for *any* avatar model used) are defined for performing linear interpolating (lerping) and/or spherical lerping (slerping) in a manner that allows for smooth movement/animation of the joints, adding precision and realism to human-avatar mirroring.

In particular, the techniques herein add a great amount of precision and realism to Human-Avatar mirroring, especially since position data (e.g., only 25 tracked body joints and 14 face joint positions for each detected user of the KINECT™ system) may generally need processing to yield more practical body data in order for a digital 3D model to have sufficient realistic movement. Specifically, simply mapping a model's joint positions to the tracked points 410 given by the input camera/sensor (with no rotation or processing) will cause meshes to warp, stretch, and clip, yielding undesirable and ultimately unusable results. Generally, joint orientation is not calculated or measured by the video capture device 110 or video processing system 130, so this may be performed by the avatar mapping process 343 according to the techniques herein.

Figure 22A:
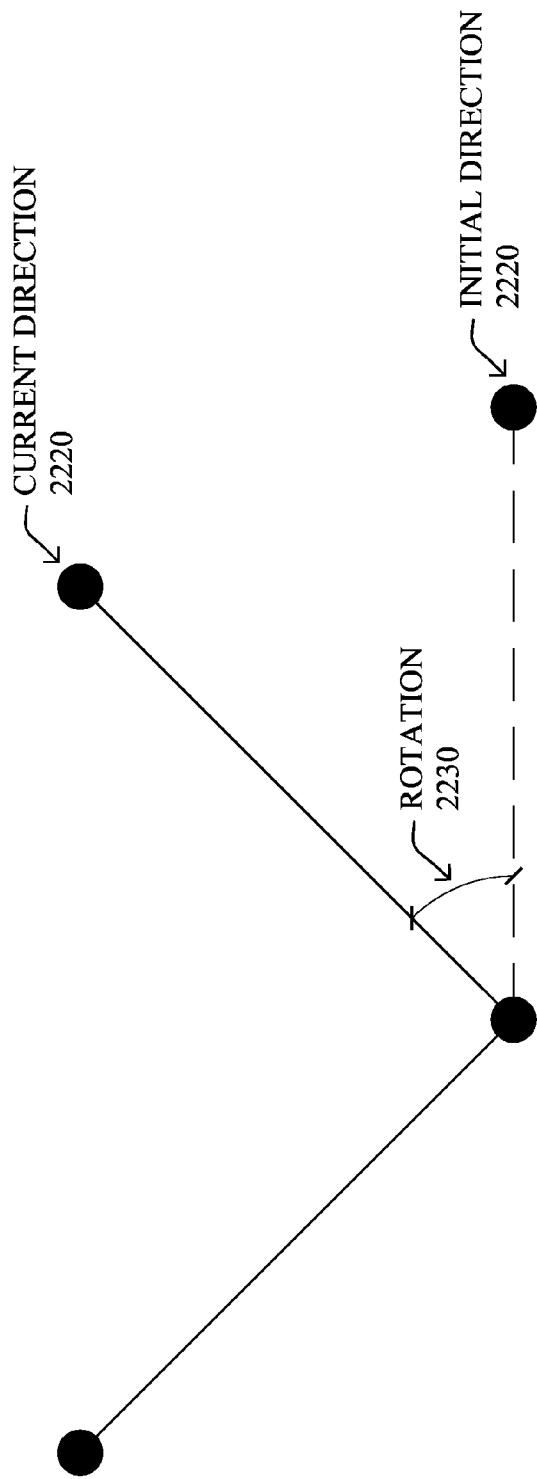
FIGS. 22A-22C illustrate an example avatar mapping process for enhanced avatar kinetic movement interpolation in accordance with one or more embodiments herein.
Figure 22B:
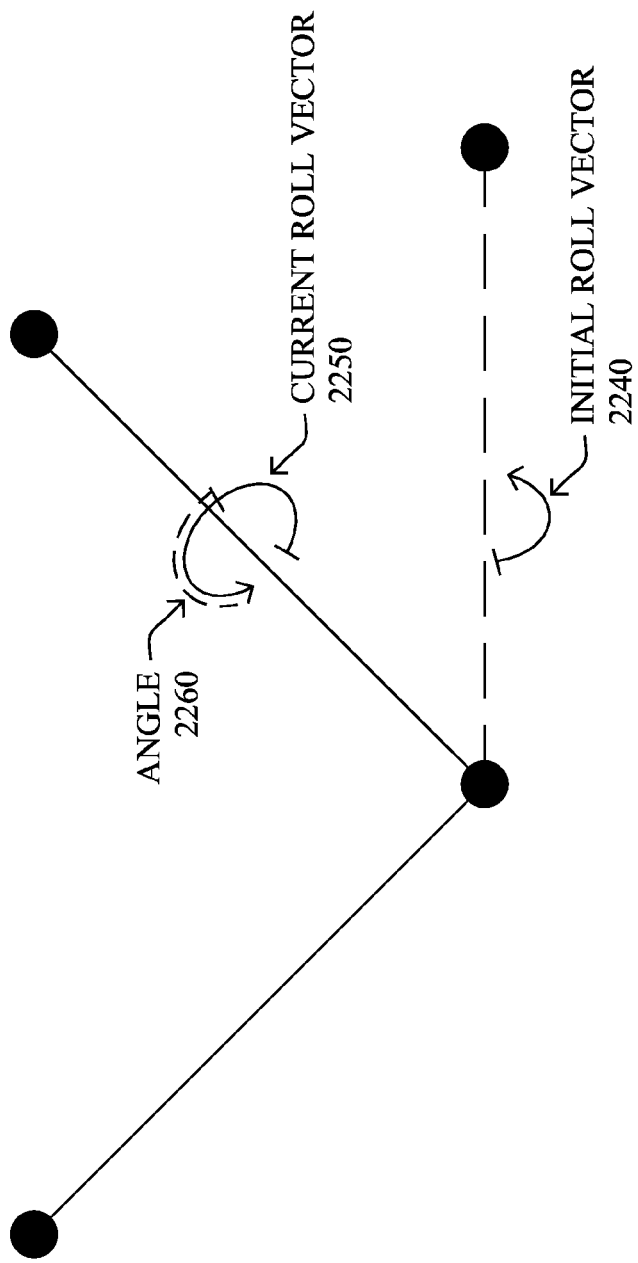
Figure 22C:
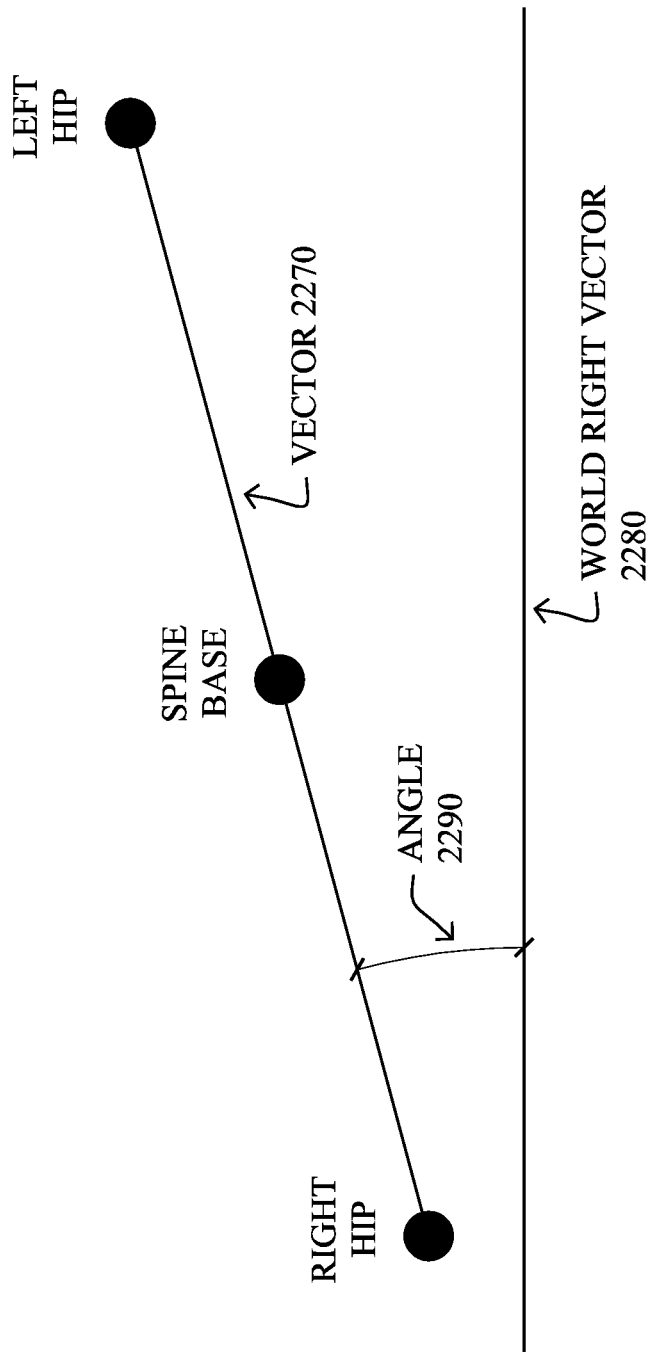

In accordance with the techniques described herein, therefore, and with reference to FIGS. 22A-22C, the avatar mapping process 343 may first calculate each joint's direction by finding the rotation 2230 from its initial direction 2210 (the unit vector from this joint's starting position to the initial position of this joint's first child) to its current direction 2220 (the unit vector from this joint's current position to this joint's first child's current position), as in FIG. 22A.

Then, for joints that can rotate about the axis of its own direction (roll), the mapping process 343 calculates the change in angle 2260 between the initial roll vector 2240 and current roll vector 2250 (a vector that is equal to the inverse of the projection of the joint's child joint direction vector), as in FIG. 22B, both with respect to the joint's current direction. These joints are all limb joints.

In addition, hips and legs may be given additional rotation based on an angle between the direction the user's hips are facing and the direction facing the video capture device (sensor) 110. This is calculated by finding the angle 2290 between the vector 2270 from the left hip joint position to the right hip joint position and the digital world Right vector 2280, as in FIG. 22C.

Notably, though the above description is generalized, various precise joint rotations and how they are calculated may also be specified for calculation by the avatar mapping process 343, such as, for example:

1. Shoulder joint rotation about the axis of the upper arm:
   The current forearm direction is calculated as the vector perpendicular to the axis of the upper arm, in the direction of the wrist.
   The initial relative forearm forward direction (representing no shoulder rotation) relative to the current upper arm orientation is calculated by applying the basic shoulder joint rotation to the world forward vector (which is the same as the initial forearm direction, perpendicular to the upper arm axis).
   The rotation of the angle between these vectors about the upper arm axis is applied to each shoulder.

2. Elbow joint rotation about the axis of the forearm:
   With no elbow rotation about the axis of the forearm (assuming no wrist rotation) and an open hand, the direction of the Forearm Axis-Thumb Vector (the vector perpendicular to the forearm axis, starting from said axis and going toward the thumb) will always be the same as the direction of the Forearm Axis-Shoulder Vector (the vector perpendicular to the same axis, going from the axis toward the shoulder).
   This means the elbow forearm rotation is equal to rotation of the angle between the Forearm Axis-Shoulder Vector (relative initial rotation) and the current Forearm Axis-Thumb Vector (relative current rotation) about the forearm axis.

3. Spine (Base, Mid, Shoulder), Hip, Knee, and Foot rotation based on body orientation:
   Body rotation is applied to portray turning or bowing.
   It is the rotation from the world right (direction) vector to the current shoulder vector (going from the left shoulder joint to the right shoulder joint).

Figure 23:
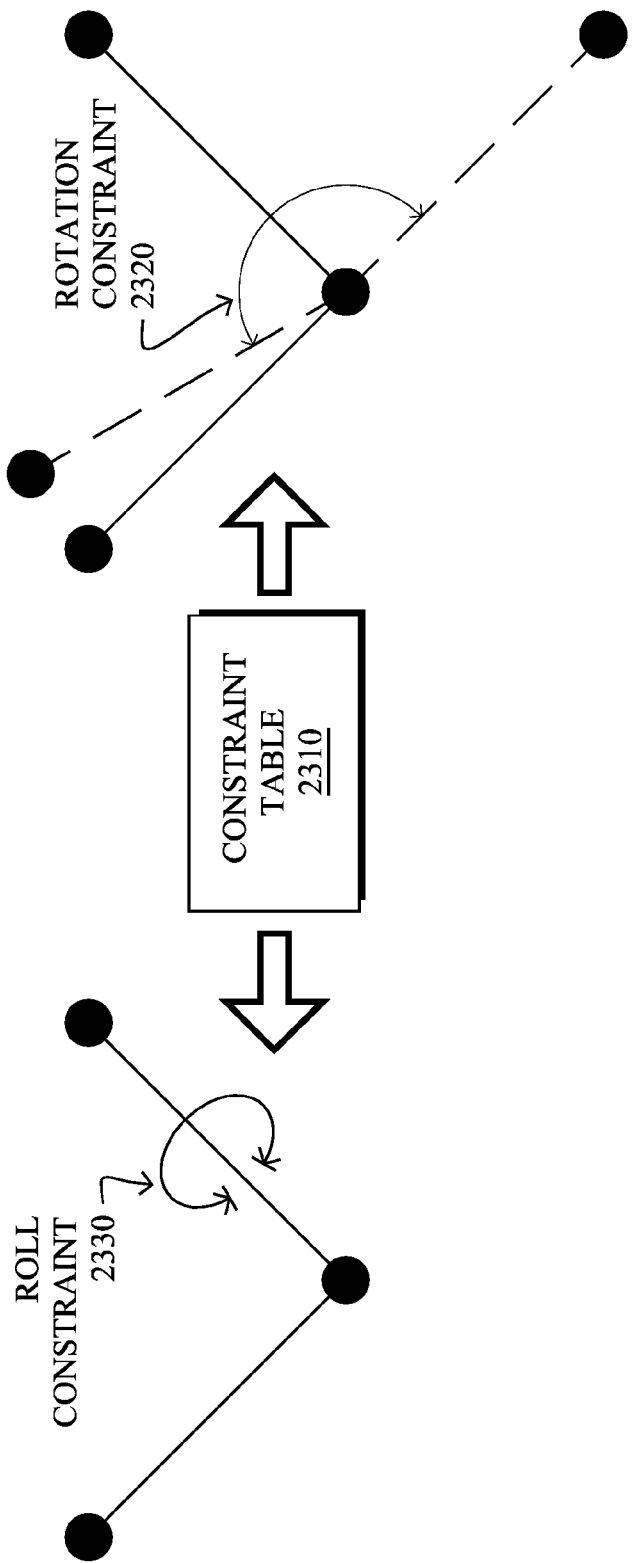
FIG. 23 illustrates example limitations for clamping various joint rotations in accordance with one or more embodiments herein.

After all joint rotations have been calculated, the values are compared to a rotation constraint table to clamp joint rotations that are beyond realistic human limits. For example, as shown in FIG. 23, a table 2310 (e.g., a data structure 347) may contain limitations for various joint rotations 2320 and rolls 2330, depicted in visual form, based on maximum physical ability of human users. Note that in one embodiment, table 2310 may be based on the user's input, and hence user (e.g., human) ability, while in another embodiment, the clamping table 2310 may be based on the avatar's capabilities, such as where the avatar has greater limitation (less "flexibility") than the user. In still another embodiment, a combination of limitations may be used to create the table 2310, such as by selecting the more-limiting clamping control for each joint.

Finally, joint movement/rotation to these new orientations is smoothed using linear interpolation (lerping) and spherical linear interpolation (slerping), respectively. Said differently, each time the video capture device 110 sends new body position data, the avatar mapping process 343 moves the model to the position that most accurately portrays the user's actual position relative to the video capture device 110. Then, between each reposition, each joint is linearly interpolated, or "lerped" (gradual movement toward a target over time to smooth out jittery movement), to a new position based on the user's raw joint positions and offset values. Similarly, the new rotations of the joints are slerped to their new rotation. (Note that too much smoothing makes the movement of the displayed animated avatar 165 appear sluggish.)

Figure 24A:
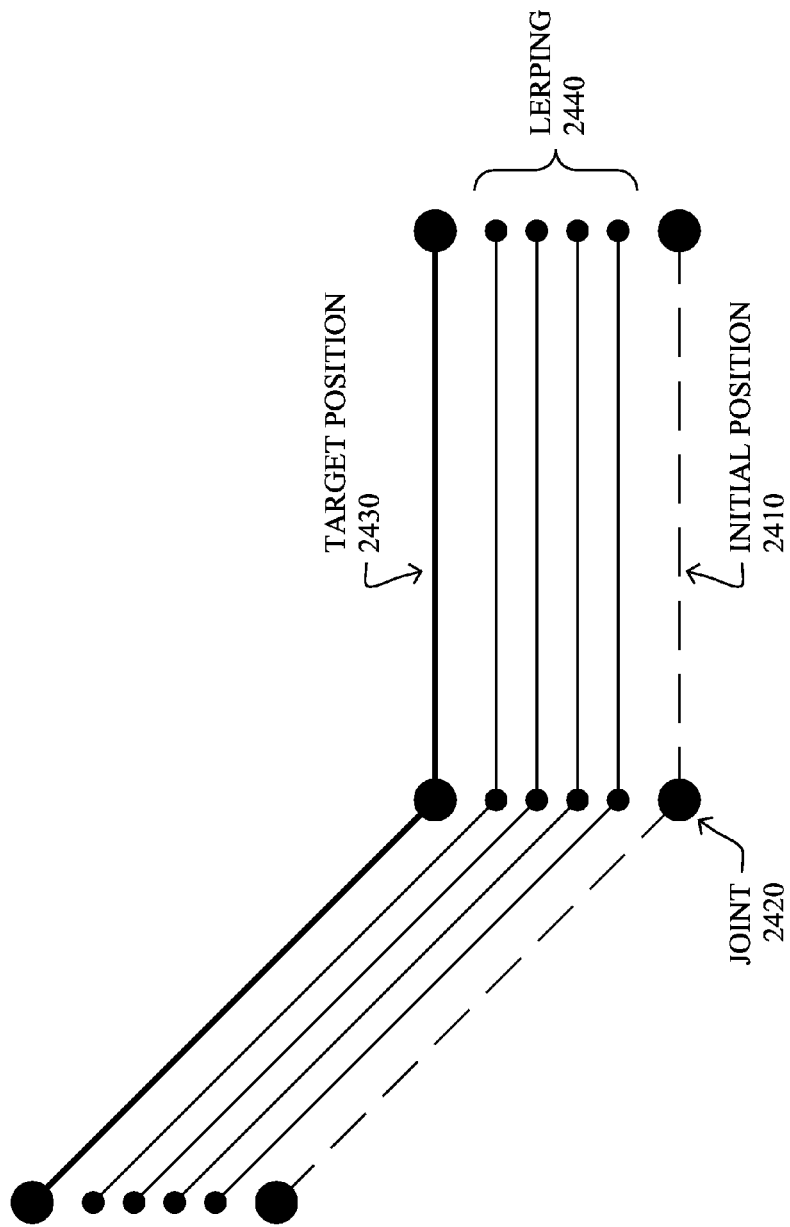
FIGS. 24A-24B illustrate examples of "lerping" and "slerping" in accordance with one or more embodiments herein.
Figure 24B:
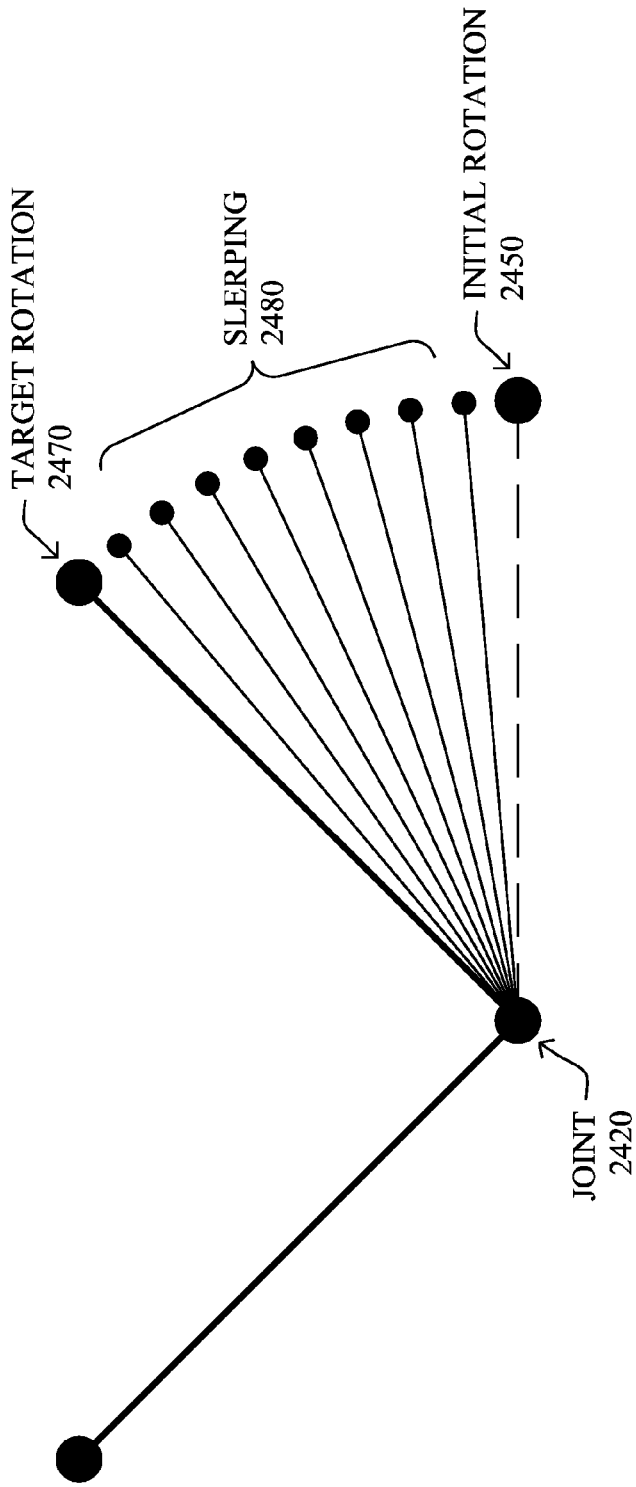

A simplified example of lerping and slerping is shown in FIGS. 24A-24B. For instance, in FIG. 24A, an initial position 2410 of a joint 2420 is shown as well as a final or "target" position 2430 of that joint 2420, and the associated "lerping" 2440 to move from the initial position to the target position (e.g., along a straight line). In FIG. 24B, an initial rotation 2450 of a joint 2420 is shown as well as a final or "target" rotation 2470 of that joint 2420, and the associated "slerping" 2480 to move from the initial rotation to the target rotation (e.g., along a curved/spherical path). Notably, both lerping and slerping can occur at the same time, and the views shown in FIGS. 24A-24B are merely for illustration.

Notably, the adjustments/calculations for clamping and lerping/slerping are important because the sensor's reliability can fluctuate immensely based on factors such as power source, cable connection, lighting, or joint occlusion. With the clamping to negate extraneous values and the linearly interpolated movement to dampen jittery joint readings, interaction with the avatar becomes a streamlined and more immersive experience for the user.

Figure 25:
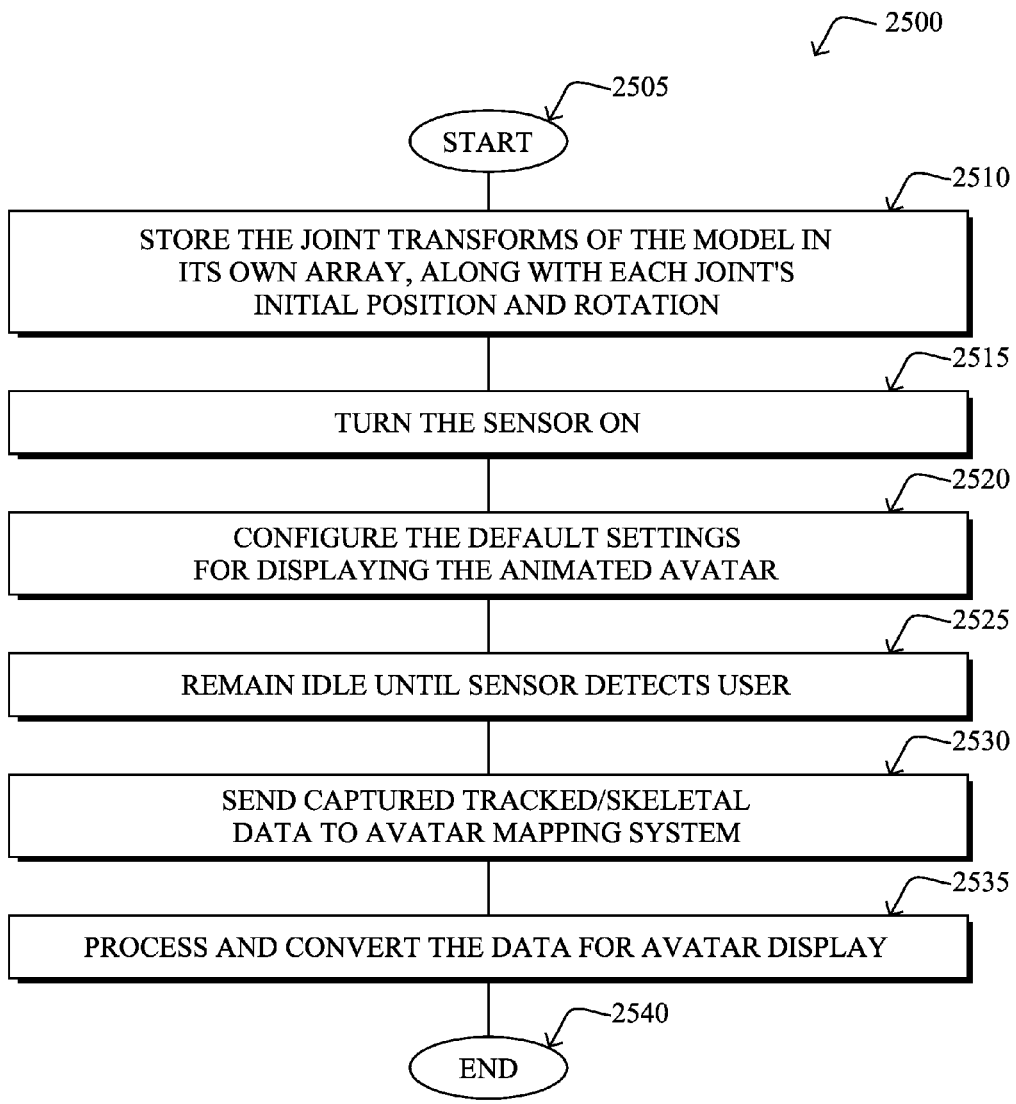
FIG. 25 illustrates an example simplified procedure for avatar control in accordance with one or more embodiments described herein.

FIG. 25 illustrates an example simplified procedure for avatar control in accordance with one or more embodiments described herein. The simplified procedure 2500 may start at step 2505 after importing an avatar model 140, and continues to step 2510, where, the avatar mapping process 343 herein attaches a script (e.g., a "C#" script) to the model 140 that stores the joint transforms (e.g., an object in the illustrative Unity platform which has position, rotation, and size) of the model in its own array, along with each joint's initial position and rotation. This information is used later to calculate rotation and model offset values. Another script, which manages the video capture device 110, may then turn the sensor on in step 2515, and configures the default settings for displaying the animated avatar 165 in step 2520, such as how much joint jitter smoothing should be used and any joint rotation constraints.

At this point the avatar mapping process may remain idle until the video capture device 110 (or "sensor") detects a human/user 120 in front of it (e.g., facing it, and at least two feet away) in step 2525, where as long as a human 120 is detectable, the video capture device 110 in conjunction with the video processing system 130 sends data 135 (raw target points 410), such as joints/bones/etc. in terms of position, position certainty, etc., to the avatar mapping system 150 (e.g., avatar mapping process 343) in step 2530. As such, the avatar mapping process 343 processes and converts the data (e.g., kinetics process 344) for the avatar display process 345 (e.g., the illustrative Unity world space) in step 2535, and the avatar 165 is the user's to control. The procedure 2500 illustrative ends in step 2540, though the user can continue controlling the avatar, new users may control the avatar, new avatars may be loaded, etc.

Figure 26:
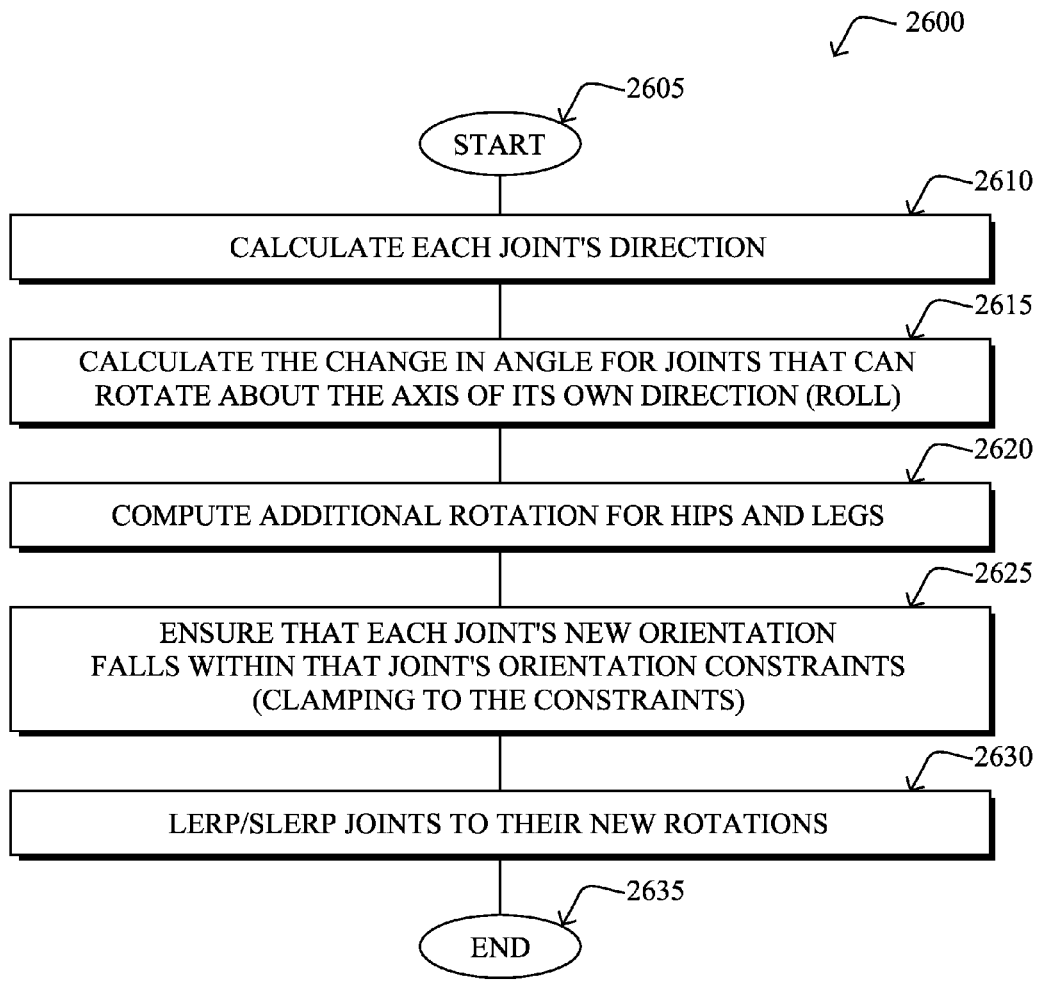
FIG. 26 illustrates an example simplified procedure for enhanced avatar kinetic movement interpolation in accordance with one or more embodiments described herein.

In addition, FIG. 26 illustrates an example simplified procedure for enhanced avatar kinetic movement interpolation in accordance with one or more embodiments described herein, in particular with regard to the specifics of step 2535 above, where the avatar mapping process 343 processes and converts the tracked/skeletal data 135. Specifically, the simplified procedure 2600 may start at step 2605, and continues to step 2610, where, as described in greater detail above, the avatar mapping process 343 first calculates each joint's direction. Then, in step 2615, the mapping process 343 calculates the change in angle for joints that can rotate about the axis of its own direction (roll). For hips and legs, an additional rotation may be given based on an angle between the direction the user's hips are facing and the direction facing the sensor in step 2620. Once all the joint directions/rotations/rolls/etc. have been calculated, each joint may be checked in step 2625 to ensure its new orientation falls within that joint's orientation constraints (i.e., if not, that joint is clamped to the constraints). Finally, the joints are given their new rotations to lerp/slerp to in step 2630, and the procedure 2600 ends in step 2635, notably repeating for each new set of incoming data 135.

It should be noted that while certain steps within procedures 2500-2600 may be optional as described above, the steps shown in FIGS. 25-26 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 2500 and 2600 are described separately, certain steps from each procedure may be incorporated into each other procedure, and the procedures are not meant to be mutually exclusive.

Advantageously, the techniques herein provide for enhanced avatar kinetic movement interpolation. In particular, as mentioned above, the techniques described herein extrapolate kinetic data in a manner that infers direction of a user's body parts to make an avatar move more accurately based on a user's physical movements. For instance, the pre-programmed calculations (e.g., for any avatar model used) perform lerping and/or slerping in a manner that allows for smooth movement/animation of the joints, adding precision and realism to human-avatar mirroring. That is, rather than simply mapping a model's joint position to the point given by the input sensor (which may be damped and jittery), the techniques herein use the rotation/processing as described above so that meshes are prevented from warping, stretching, and clipping, (which would otherwise yield undesirable and ultimately unusable results), making a user's interaction with an avatar a streamlined and more immersive experience.

——Dynamic Joint Mapping for Avatar Control——

As mentioned above, according to one or more embodiments herein, dynamic joint mapping for avatar control allows for mapping any skinned digital avatar model (e.g., particularly a three-dimensional model) containing a joint hierarchy to an input control algorithm. In particular, as noted above, computer animation is typically a very time consuming activity requiring CG expertise and special software tools. In particular, a model of an object to be displayed (e.g., avatar model 140) is generated as a 3D mesh, where a CG animator generates and embeds a skeleton inside the 3D mesh, painting individual bone weights onto each motion vertex or "joint". Motion capture data or an inverse kinematics engine can then drive the bones of the avatar, which then transforms the mesh. Currently, however, this process may take hours or days, and is not straightforward or otherwise simple for general animators or designers.

The techniques herein enhance the current state of the skeletal tracking algorithms and associated control of computer animated objects by automating the import of new 3D meshes and models. In particular, the techniques herein alleviate the cumbersome manual process of mapping a 3D model (avatar model 140, particularly mapping points 610) to a control input system (input points 510) by providing an optimized mapping between the model and the input system regardless of discrepancies between the defined objects (e.g., greater or fewer defined "bones" and/or "joints" of a corresponding "skeleton").

In a first embodiment of the avatar mapping process 343 described herein, a script can auto-map the points of the model 140 to the input points 510 through name search functions to determine the corresponding joints based on the proper use of syntax and naming convention. For example, one naming convention is shown above with reference to FIG. 5B, though any suitable naming convention may be used. As such, the mapping process may simply correlate the corresponding joints based on their names, and perform the associated mapping.

In a second embodiment of the avatar mapping process 343, however, there is no need for a model to have a specific naming convention or to have all of the joints, e.g., particularly where a hierarchical model structure is employed. For instance, the avatar mapping process 343 herein can take any skinned digital 3D model containing a joint hierarchy, and by identifying the base joint of the model, can use this base joint (mapping point 610) to map outward consecutive available joints with an algorithm based on the hierarchy and relative joint positions.

The base joint, or primary/main joint, is the joint that is the parent, direct or indirect, of all other joints in the model. In general, this should be the Hip joint, as it is the center of mass around which everything moves, though other base joints may be possible. With reference again to FIGS. 5A-5B, the base joint in the input point hierarchy 500 is referred to as the SpineBase (510-1).

Figure 27A:
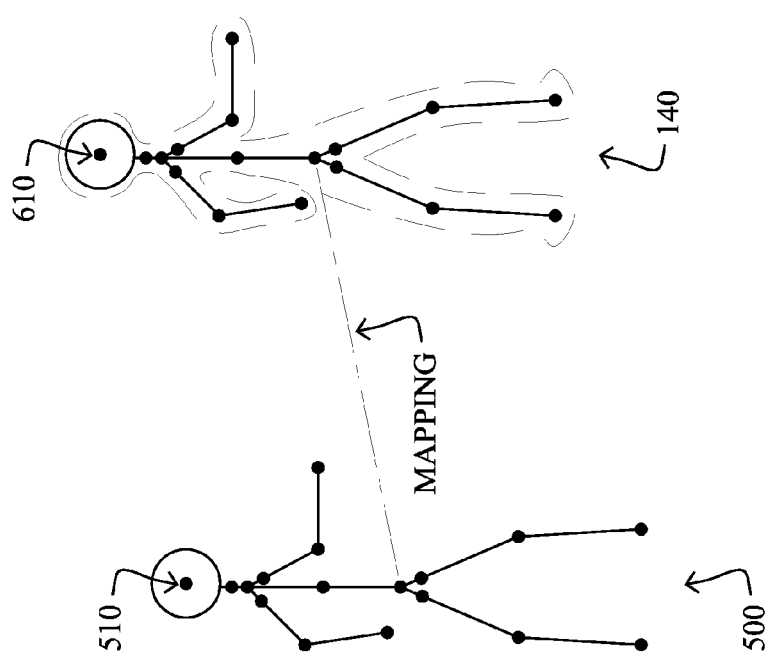

For instance, according to the embodiments herein, the avatar mapping process 343 may first locate a center/primary joint, whether based on hierarchically defined joints in the model (e.g., the one from which the rest of the joints ultimately depend) or else based on graphical comparison of the input joints 510 to the model joints 610. For example, in FIGS. 27A-27C, a representative graphical overlay of the joints to be mapped is shown, where the two primary joints are aligned (FIG. 27A). From this position, the avatar mapping process can expand the joint mapping/assignment hierarchically from this point (FIG. 27B), where the joint hierarchy defines each joint ("A") as a direct child of the closest connecting joint ("B") that can move said joint ("A"). For example, each ElbowJoint is a child of a ShoulderJoint, while the ShoulderLeftJoint, ShoulderRightJoint, and NeckJoint are all direct children of SpineTopJoint, and so on. As such, once a ShoulderLeft joint is mapped, a next logical joint to map would the ElbowLeft joint.

Figure 27C:
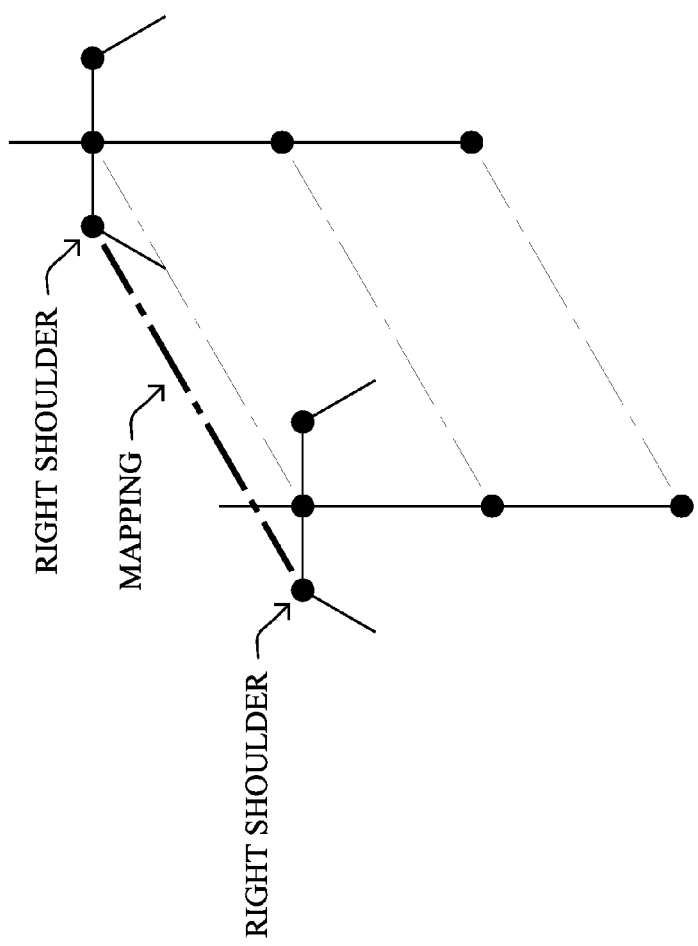

To assist this process, various enhancements are available to the avatar mapping process 343. For instance, where "forks" or "branches" occur in the hierarchy, such as where the SpineTop joint meets the ShoulderLeft joint, ShoulderRight joint, and Neck joint, graphical differentiation may be used based on the overlay of the input joint model and the avatar's mapped point model. For example, the ShoulderRight joint of the input joints 510 would align to the joint nearest (and on the same side as) the corresponding right shoulder joint 610 of the avatar model, as illustrated in FIG. 27C. From there, the mapping process could continue to hierarchically map the remaining joints of the right arm.

To illustrate this concept further, if the avatar model 140 is humanoid (which may be conveyed as a user input when importing the model, such as a ticker box), the mapping system herein may determine, based on detected joint count, present joint position ratios, and expected joint ratios, the identity of each detected joint. Said differently, comparing the "expected" input model to the avatar model, and taking joint position/quantity into account, the avatar mapping process 343 can generally determine where similar joint positions "should" be, and can map them accordingly.

Figure 28:
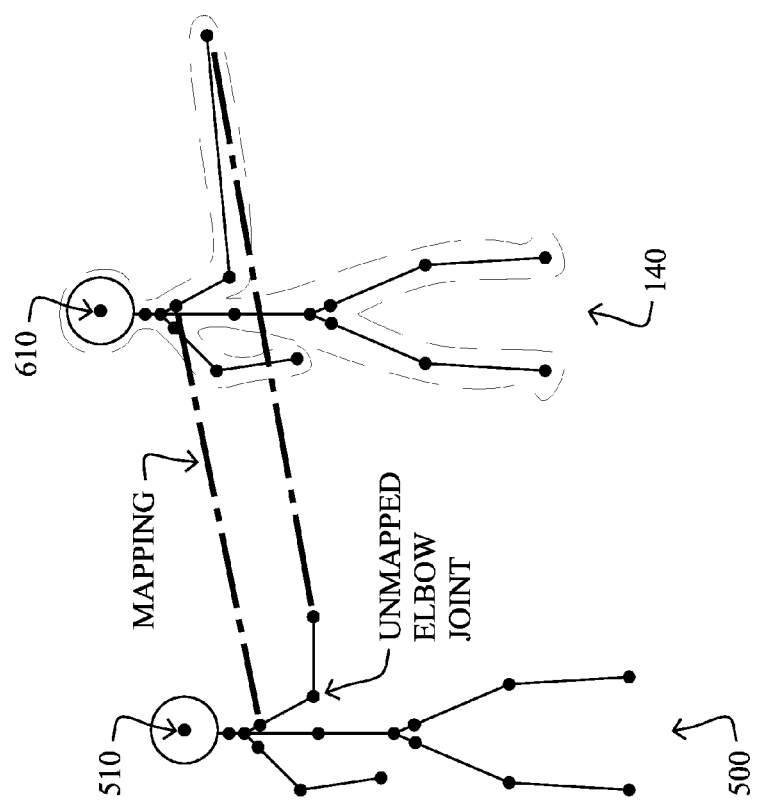
FIG. 28 illustrates an example of dynamic joint mapping with fewer avatar joints in accordance with one or more embodiments herein.

Note that there are occasions when an avatar model 140 does not have exactly the same joints 610 (the same number or the same locations) as the tracked/input joints 510. For example, if an avatar character has no elbows, then to prevent mapping a user's elbow (hierarchically next from the shoulder in the input model) to controlling the wrist/hands (hierarchically next from the shoulder in the avatar model), various techniques are described herein. In one embodiment, the system can determine the identity of each detected joint based on detected joint count, present joint position ratios, and expected joint ratios, as above. For instance, if there are only 15 joints found in the avatar model, and the input model has 25 joints, then the mapping system herein can assume that there will be some joints missing, and can use the initial joint position to assess which joint it should be. In the missing elbow example above (e.g., the monster from FIG. 7), as illustrated in FIG. 28, the joint after the shoulder will be much further than normal (with the elbow), so the system may "guess" that this is the missing joint, and skip its assignment, accordingly.

Notably, in an alternative or additional embodiment, though joint naming conventions may not be the same, it is possible that certain terms are similar enough to merit a search functionality to align and/or confirm joint mappings. For example, if the avatar mapping process 343 is expecting a ShoulderLeft joint, the terms "shoulder", "left", "arm+top", "L", etc., may be searched within the strings of the joint names in the avatar model 140 to determine various confirming clues to the particular joint being mapped. Such string searching is also beneficial for "skipped" joint mappings as described above, such as to confirm that a "hand" joint is actually mapped to a hand, a "foot" joint is actually mapped to a foot, and so on.

In yet another embodiment, the hierarchical mapping engine may perform a mixture of "reverse hierarchical" mapping, such as to map from the outer extremities inward, such as making the fingers and/or hands equate to an extreme portion of the avatar (e.g., a starfish points), and then working out the inner joints in a manner that eventually maps the primary/base joint.

Figure 29A:
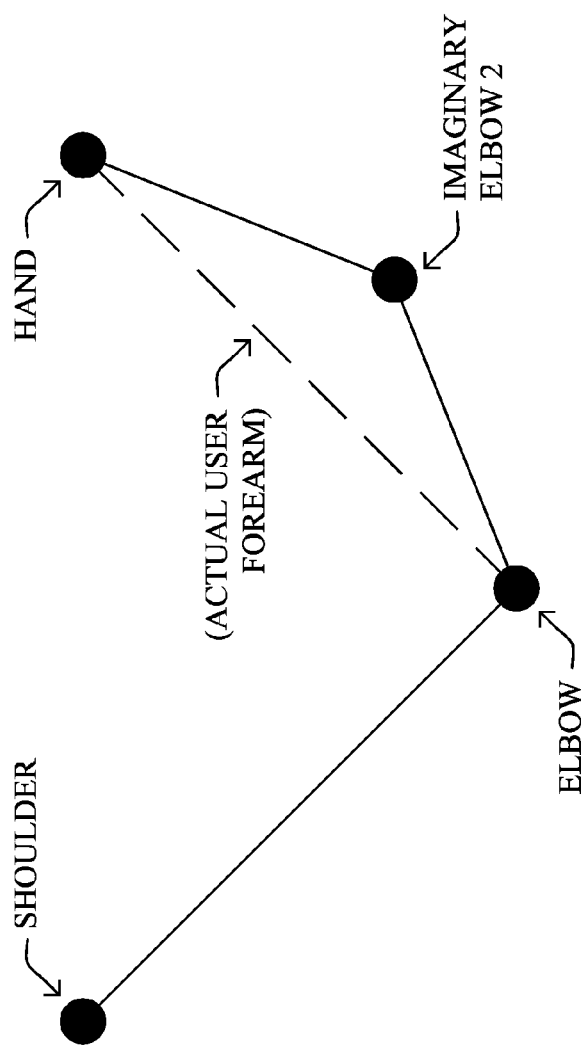
FIGS. 29A-29B illustrate examples of dynamic joint mapping with more avatar joints in accordance with one or more embodiments herein.
Figure 29B:
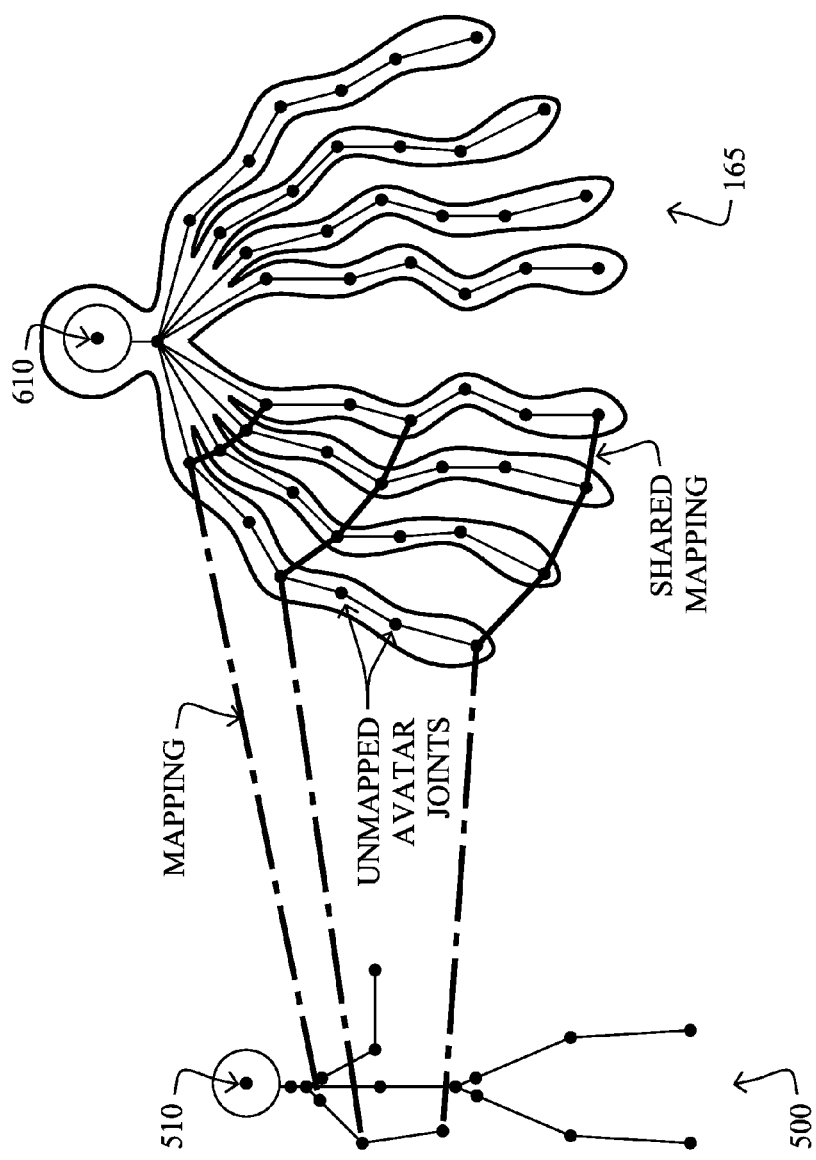

In still another alternative or additional embodiment, certain measures may be taken to account for instances when additional joints 610 are present in the avatar model than there are in the input model (joints 510). For example, avatars such as an octopus or an alien character with multiple elbows on one arm would not align with a humanoid input model. In one example embodiment, the avatar mapping process 343 may be configured to handle any unassigned avatar joints through processing likely positions of the untracked joints, thus making "imaginary" tracked joints, as illustrated in FIG. 29A (e.g., an average position of the two hierarchically opposed joints, e.g., a mapped elbow and a mapped wrist being used to determine the location of an unmapped elbow therebetween). In another example embodiment, the unmapped joint may be treated as either a dual-purposed mapping or else an animation. For instance, as in the octopus example, a user's arm may be mapped to one of the octopus' arms, and three other arms are mapped to the same user's arm, as shown in FIG. 29B. Also, since an octopus arm has much more flexibility than a human arm, by mapping the user's elbow to roughly the middle of the octopus arm, animations may also be used to create a more "fluid" motion of the octopus arm(s) than is available in a human arm.

Note that the techniques above are not mutually exclusive and may incorporate still other techniques for automated mapping of an avatar. Also, not all of the techniques above need be implanted, and any combination of the above techniques may be used to automatically map an avatar model to an input model. Further, the techniques above have been shown with certain example implementations, but such examples are not meant to be limiting to the scope of the present invention.

Figure 30:
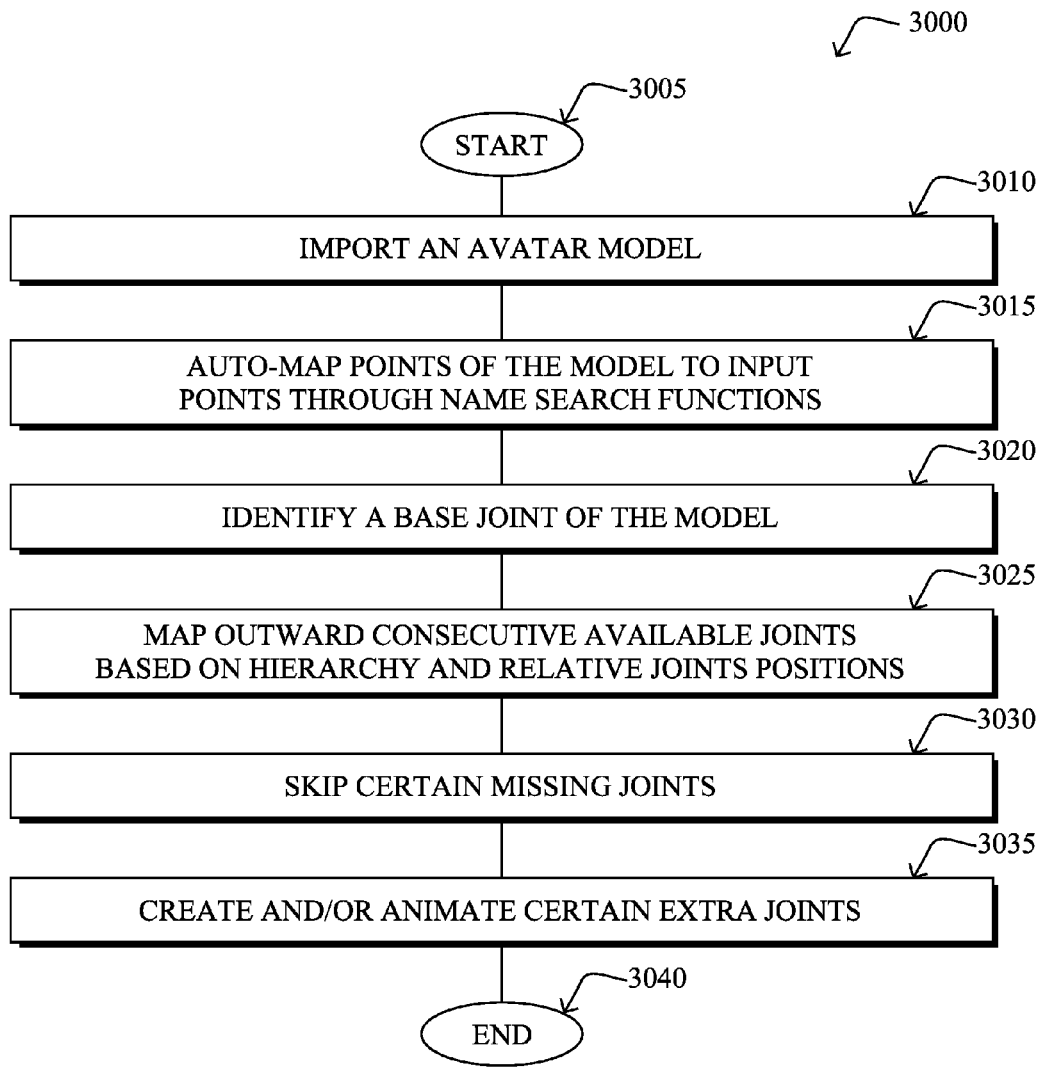
FIG. 30 illustrates an example simplified procedure for dynamic joint mapping for avatar control in accordance with one or more embodiments described herein.

FIG. 30 illustrates an example simplified procedure for dynamic joint mapping for avatar control in accordance with one or more embodiments described herein. The simplified procedure 3000 may start at step 3005, and continues to step 3010, where an avatar model 140 (e.g., FBX model) is imported. In step 3015, if the option is available, the avatar mapping process 343 can auto-map the points of the model 140 to the input points 510 through name search functions to determine the corresponding joints based on the proper use of syntax and naming convention. In the event that is not available, then in step 3020, the system can identify a base joint of the model, and map outward consecutive available joints with an algorithm based on the hierarchy and relative joint positions in step 3025, as described above. In particular, in step 3025, the system can determine, based on detected joint count, present joint position ratios, and expected joint ratios, the identity of each detected joint. As mentioned above, during this process, certain joints may be skipped (step 3030), and certain joints may be imaginarily created or animated (step 3035), accordingly. Once the avatar has been mapped, previous steps can be repeated to confirm that the mapping was done correctly (i.e., to ensure correct joints are mapped). For example, the process could first map via a name search function, then perform the hierarchical mapping by starting with the base joint and mapping outward for other joints, then repeating the name search function to confirm that joints are mapped in a manner that makes sense, and so on. The procedure ends in step 3040, and the avatar is ready to be controlled by a user 120. Note that there may also be a manual confirmation step, such as having an operator confirm or manually correct certain mappings that perhaps were not properly performed, or else having the process execute again with different parameters or a different order of steps (e.g., as a learning machine process).

It should be noted that while certain steps within procedure 3000 may be optional as described above, the steps shown in FIG. 30 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Advantageously, the techniques herein provide for dynamic joint mapping for avatar control. In particular, as mentioned above, the techniques described herein alleviate the cumbersome manual process of mapping a model (especially a 3D model) to a control input system, particularly by providing an optimized mapping between the model and the input system regardless of discrepancies between the defined objects. That is, the techniques herein can map any skinned digital avatar model containing a joint hierarchy to an input control algorithm, effectively cutting the time to perform this process manually from one full day to a matter of seconds.

——Dynamic Animation Population for Avatar Control——

As mentioned above, according to one or more embodiments herein, dynamic animation population for avatar control allows for animations to be provided for any imported avatar (e.g., two-dimensional or three-dimensional displayed or holographic avatars) that have no pre-configured animations, or else a limited set of pre-configured animations.

An "animation", in particular and as defined herein, is a pre-configured action or set of actions to be performed by an animated avatar 165 in response to one or more triggering events, where the triggering events may be based on action from user 120 or else based on other factors (e.g., idle time, noises, haphazard interruptions, etc.) For example, in addition to merely moving an avatar 165 corresponding to input from a user 120, additional animations can be programmed to correspond to particular movements or "animation triggers", such as small gestures (e.g., finger movements corresponding to a hand opening and closing) or large gestures (e.g., completing a dance move, completing a sports action (such as a baseball swing, basketball shot, bowling follow-through, etc.), completing full spins, and so on), where a partial movement translates into a more complete movement (e.g., a user turning more than 90 degrees translating to a full 360-degree turn, or smaller basketball shot motion translating to a full jump shot, etc.), or even where a specific movement translates into a separately defined motion (e.g., clapping hands translating into a dance routine, closing the hand associated with the weapon's arm in the monster of FIG. 7 corresponding to firing the weapon, and so on).

Notably, many video capture devices and associated video processing processes have limitations for hand and body tracking due to joint occlusion, so to make up for these limitations, animation in this manner can also add to the reality of the motion of the avatars 165. For instance, motions of the hands, in particular, can be assumed based solely on the limited number of tracked points (e.g., using only the thumb and hand tip inputs to trigger finger animations that more fluently represent the opening and closing of all of the fingers of the hands).

Figure 31A:
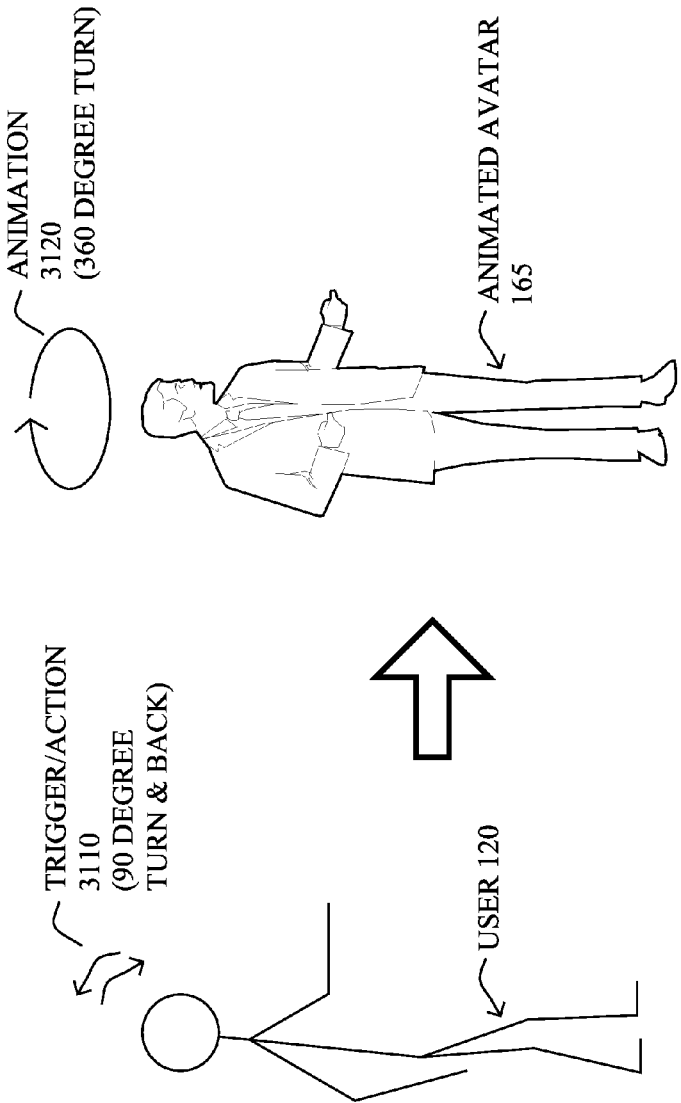
FIGS. 31A-31B illustrate examples of animation control in accordance with one or more embodiments herein.
Figure 31B:
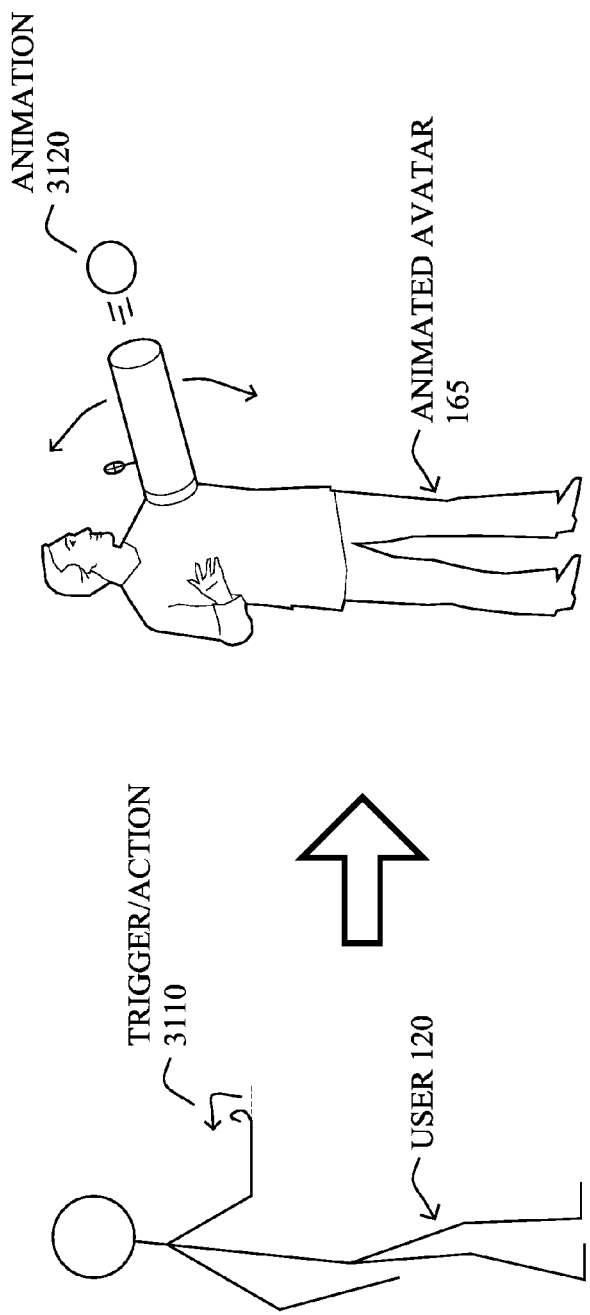

FIGS. 31A-31B illustrate simplified examples of animation control, where the user 120 performs a triggering action 3110 (e.g., turning more than 90 degrees (FIG. 31A), closing a hand (FIG. 31B), etc.), and where the animated avatar 165 performed an associated animation 3120 (e.g., spinning 360 degrees (FIG. 31A), firing the weapon (FIG. 31B), etc.). In general, as noted above, the animations may be designed to increase reality of the avatar's movements, such as performing pre-defined spinning movements (FIG. 31A), more lifelike opening and closing of hands, more fluid motions, more facial expressions, etc., than what is tracked simply by the body tracking algorithms described above. In addition, as also noted above, the animations may also be designed to add new actions, such as firing weapons (FIG. 31B), jumping, flying, transforming, dancing, etc.

In addition, as mentioned above, non-user-based triggers may be used to cause animations, such as expiration of timers, set periods of idle time (e.g., animating an avatar 165 in response to no user 120 present for a period of time to garner attention), humorous interludes (e.g., refusing to mirror user action, doing opposite motions from the user), and so on.

Generally, the list of possible animations is endless, and the mention herein of certain animations, types of animations, categories of animations, etc. is not meant to be limiting to the scope of the embodiments associated with the present invention.

Though the ability to provide animations to an avatar is well known, the techniques herein provide a manner in which default animations may be used for *any* imported avatar model 140, regardless of whether animations are provided within that model. In particular, during an avatar mapping process (e.g., performed by avatar mapping process 343), an avatar model 140 (e.g., an FBX model) is imported and converted (or mapped) from the original file type (e.g., FBX) into various sub-files to represent joints/bones, etc., called a Human Template File (".ht" or "HT"). (For example, in a KINECT™ system, the Unity platform converts FBX files to HT sub-files.)

Human Template files, in particular, not only store joint data, but also store joint animations, as will be understood in the art. That is, any defined animation is therefore controllable through the Human Template files. In one particular protocol, in the event that there are no pre-defined animations, however, the generated HT files will be empty. Moreover, in certain protocols, it may be possible that only certain joints are associated with animations, or only certain user motions are associated with animations.

Figure 32:
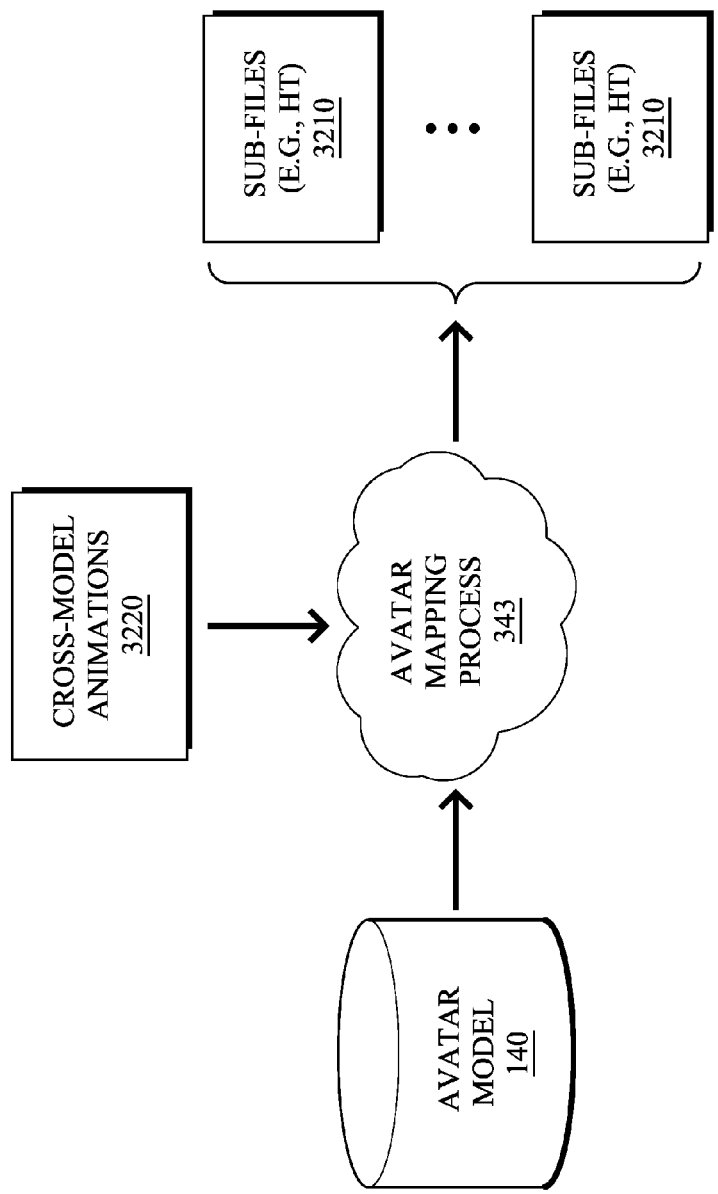
FIG. 32 illustrates an example of dynamic animation population for avatar control in accordance with one or more embodiments described herein.

According to the present invention, preloaded animation files (e.g., HT files) files can automatically animate any character (avatar model 140) imported. In particular, as shown in FIG. 32, an avatar model 140 being imported into avatar mapping process 343 is converted (or mapped) into one or more Human Template files 3210. In the dynamic mapping process, it can be determined whether preloaded animation files 3220 (e.g., HT files) are to be used to automatically add triggered animations to models when imported (e.g., gesture, action, and/or non-user triggered animations).

For instance, certain imported models 140 may have existing animations, and if so, the avatar mapping process 343 may use those animations with the generated Human Template file 3210 for the given animations and associated animation triggers. Models without animations, however, may alternatively be given a default set of animations 3220, which allows these particular models to perform certain animations when triggered.

Because these preloaded (default) animations 3220 can be applied to just about any model, they may be referred to as "cross-model" animations. That is, these animations can be used by any avatar (character, person, object, etc.) to perform the desired animation (e.g., the flower avatar can perform a 360-degree turn as can the monster avatar above), assuming, that is, that all corresponding joints (or other mapped points 610) of the animation exist in the model. In particular, if certain mapped points 610 don't exist in an avatar model 140, such as the flower not having any fingers or the monster not having fingers on one hand, then the preloaded animation cannot be applied to those particular joints, and the preloaded animations 3220 need not be used during the model import.

Also, in one embodiment, the preloaded animations 3220 are only used if the avatar model 140 does not already have any animations associated with it. However, in another embodiment, it is possible to add these preloaded animations 3220 in conjunction with animations supplied by the avatar model. For example, the determination of whether to use the preloaded animations 3220 may be on a joint-by-joint (or joint combinations) basis, or other manner to avoid conflicting animation population. For example, if the avatar model 140 already has an animated associated with closing a hand or spinning around, then any similar preloaded animation 3220 need not be used. That is, if the model already has certain animations, these will be used instead of the preloaded default animations. In still another embodiment, the preloaded animations 3220 may be used instead of any conflicting animations from the avatar model 140, and in still another embodiment, both sets of animations may be used, e.g., selecting a particular one to use at any given time, to provide animation variety.

Figure 33:
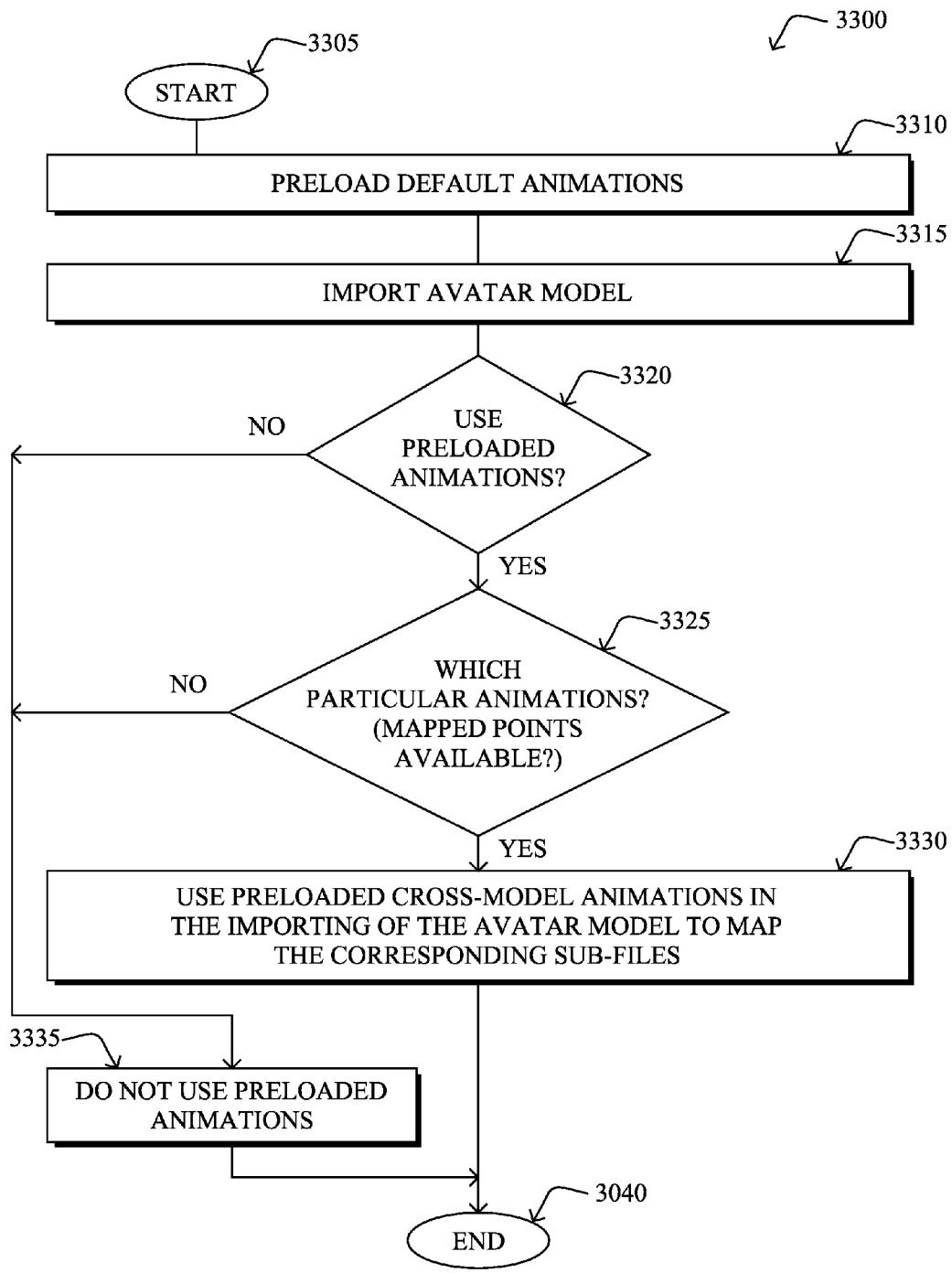
FIG. 33 illustrates an example simplified procedure for dynamic animation population for avatar control in accordance with one or more embodiments described herein.

FIG. 33 illustrates an example simplified procedure for dynamic animation population for avatar control in accordance with one or more embodiments described herein. The simplified procedure 3300 may start at step 3305, and continues to step 3310, where default animations 3220 are preloaded into the avatar mapping process 343. When an avatar model 140 is imported in step 3315, the avatar mapping process 343 may make a determination in step 3320 as to whether the preloaded animations 3220 should be used. For example, as described above, this may simply consist of determining whether any animations are provided by the avatar model 140, or else may be more complex by determining whether certain mapping point combinations have animations, and so on. If preloaded animations are to be used, then in step 3325 it may also be determined which particular cross-model animations 3220 are applicable to the imported model 140 based on whether the relevant joints used in the cross-model animation are present and defined in the imported avatar model 140. If so, then in step 3330 the animations are used in the importing of the avatar model 140 to map the corresponding sub-files 3210 (e.g., Human Template files). If the answer to either determination above is "no", however, then in step 3335 the preloaded animations are not used. The procedure illustratively ends in step 3340.

It should be noted that while certain steps within procedure 3300 may be optional as described above, the steps shown in FIG. 33 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Advantageously, the techniques herein provide for dynamic animation population for avatar control. In particular, as mentioned above, the techniques described herein alleviate much of cumbersome manual process of mapping a model (especially a 3D model) to a control input system, where animations are provided for any imported avatar that has no (or limited) pre-configured animations. Since these cross-model animations may be used for any imported avatar model (assuming the proper joint matching, described above), avatar model design is also simplified, allowing designers to rely on the cross-model animations to add life and character to the avatars in ways not otherwise afforded.

While there have been shown and described illustrative embodiments, it is to be understood that various other adaptations and modifications may be made within the spirit and scope of the embodiments herein. For example, while the embodiments have been described in terms of particular video capture devices, file formats, tracking points, etc., other suitable devices, formats, points, etc., may also be used in accordance with the techniques herein. Note also that any reference to "video" or "image" or "picture" need not limit the embodiments to whether they are motion or time-sequence photography or still images, etc. Moreover, any two-dimensional avatars/models may be used herein, and the illustration provided above as a three-dimensional avatar/model is merely one particular embodiment.

In addition, the techniques herein may be used in conjunction with one or more other avatar control and/or modelling techniques, and any technique described herein may be used in combination of any other techniques herein. For instance, it is expressly contemplated herein that the techniques described separately herein may be used in combination, such as where even though procedures 1400, 1600, 2100, 2500, 2600, 3000, and 3300 are described separately, certain steps from each procedure may be incorporated into each other procedure, and the procedures are not meant to be mutually exclusive.

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
generating an avatar for display as a holographic projection, wherein the avatar is a computer animated graphical representation;
receiving user control input of the avatar, the user control input based on detected movements of the user via a natural user interface executing skeletal tracking to detect the movements of the user at a remote location;
converting the user control input into avatar movement;
displaying the avatar with the avatar movement as a holographic projection; and
projecting the holographic projection of the avatar with the avatar movement based on the skeletal tracking using a Pepper's Ghost Illusion technique.

2. The method as in claim 1, wherein the holographic projection is of a character.

3. The method as in claim 1, further comprising:
using a projector or video display panel as a light source for the Pepper's Ghost Illusion technique.

4. The method as in claim 1, further comprising:
interfacing a camera, microphone, or speaker to allow a viewer of the avatar to interact with the avatar.

5. The method as in claim 4, wherein receiving user control input of the avatar based on detected movements of the user comprises:
receiving control signals from a controller located to a side of the projection or located at a remote location.

6. The method as in claim 1, further comprising:
controlling the avatar using an artificial intelligence engine that is configured to interact with a viewer of the avatar.

7. The method as in claim 6, wherein controlling the avatar using an artificial intelligence engine comprises:
playing a prerecorded voice dialogue and prerecorded animations.

8. The method as in claim 1, wherein the holographic projection is configured to enable a participant to stand behind the holographic projection to appear to a viewer of the avatar that the participant is physically interacting with the avatar, wherein the method further comprises:
providing an image to the participant of the avatar from the perspective of the viewer.

9. A tangible, non-transitory, computer-readable media having software encoded thereon that causes a holographic projection system to execute a process comprising:
generating an avatar for display as a holographic projection, wherein the avatar is a computer animated graphical representation;
receiving user control input of the avatar, the user control input based on detected movements of the user via a natural user interface executing skeletal tracking to detect the movements of the user at a remote location;
converting the user control input into avatar movement;
displaying the avatar with the avatar movement as a holographic projection; and
projecting the holographic projection of the avatar with the avatar movement based on the skeletal tracking using a Pepper's Ghost Illusion technique.

10. The computer readable medium as in claim 9, wherein the holographic projection is of a character.

11. The computer readable medium as in claim 9, wherein the holographic projection system further comprises a projector or video display panel as a light source for the Pepper's Ghost Illusion technique.

12. The computer readable medium as in claim 9, wherein the process further comprises:
interfacing a camera, microphone, or speaker to allow a viewer of the avatar to interact with the avatar.

13. The computer readable medium as in claim 9, wherein receiving user control input of the avatar based on detected movements of the user comprises:
receiving control signals from a controller located to a side of the projection or located at a remote location.

14. The computer readable medium as in claim 9, wherein the process further comprises:
controlling the avatar using an artificial intelligence engine that is configured to interact with a viewer of the avatar.

15. The computer readable medium as in claim 14, wherein controlling the avatar using an artificial intelligence engine comprises:
playing a prerecorded voice dialogue and prerecorded animations.

16. The computer readable medium as in claim 9, wherein the holographic projection is configured to enable a participant to stand behind the holographic projection to create the illusion to a viewer of the avatar that the participant is physically interacting with the avatar, wherein the process further comprises:
providing an image to the participant of the avatar from the perspective of the viewer.

17. An apparatus comprising:
a holographic projection system including a processor coupled configured to execute one or more processes; and
a memory configured to store a process executable by the processor, the process when executed configured to:
generate an avatar for display as a holographic projection, wherein the avatar is a computer animated graphical representation;
receive user control input of the avatar, the user control input based on detected movements of the user via a natural user interface executing skeletal tracking to detect the movements of the user at a remote location;
convert the user control input into avatar movement;
display the avatar with the avatar movement as a holographic projection; and
project the holographic projection of the avatar with the avatar movement based on the skeletal tracking using a Pepper's Ghost Illusion technique.

18. The apparatus as in claim 17, wherein the process when executed is further configured to:
control the avatar using an artificial intelligence engine that is configured to interact with a viewer of the avatar.

* * * * *